US012654313B2

(12) United States Patent
Duan et al.

(10) Patent No.: US 12,654,313 B2
(45) Date of Patent: Jun. 16, 2026

(54) EXTENDABLE VARIABLE-STIFFNESS BOOM-LIFT-MOUNTED ROBOT WITH VIBRATION COMPENSATION

(71) Applicant: The Hong Kong University of Science and Technology, Hong Kong (CN)

(72) Inventors: Molong Duan, Hong Kong (CN); Yi Zhou, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 50 days.

(21) Appl. No.: 18/960,720

(22) Filed: Nov. 26, 2024

(65) Prior Publication Data

US 2025/0214232 A1    Jul. 3, 2025

Related U.S. Application Data

(60) Provisional application No. 63/615,786, filed on Dec. 29, 2023.

(51) Int. Cl.
B25J 9/16    (2006.01)

(52) U.S. Cl.
CPC ............. B25J 9/162 (2013.01); B25J 9/1638 (2013.01)

(58) Field of Classification Search
CPC ........ B25J 9/162; B25J 9/1638; B25J 9/0009; B25J 9/1615; B25J 9/1653; B25J 9/1664; B25J 11/0075; B25J 13/088; B25J 13/089; F16F 15/02; F16F 15/002; F16F 2230/08; F16F 15/22; B66F 11/04; B66F 11/042;
(Continued)

(56) References Cited

U.S. PATENT DOCUMENTS 10,150,653 B2    12/2018    Kyllingstad
11,697,209 B1    7/2023    Mourlam et al.
(Continued)

FOREIGN PATENT DOCUMENTS

CN    113083568 A    7/2021
CN    116021555 A    4/2023
(Continued)

OTHER PUBLICATIONS

Robotics 24/7, "RE2 Robotics Partners With JLG Industries to Put Robot Arms on Aerial Lifts", Feb. 1, 2022, 3 pages.
(Continued)

*Primary Examiner* — Abby Lin
*Assistant Examiner* — Esvinder Singh
(74) *Attorney, Agent, or Firm* — Amin, Turocy & Watson, LLP

(57) ABSTRACT

Architectures and techniques are provided for improved vibration compensation for a boom lift-robot-mounted (BLMR) system, which can result in improved BLMR operating precision and safety at a reduced cost. Boom lifts typically contain extendable large-scale, variable-stiffness structures, subject to complex nonlinear static deformation and dynamic motion/gust-induced vibrations. Said vibrations can be compensated for at an end effector of a robot via a Jacobian-based vibration compensation via IMU (JVCI) procedure. The output of the JVCI procedure can rely on IMU feedback and can be combined with other vibration-mitigation techniques, including various feedforward techniques.

20 Claims, 13 Drawing Sheets

(58) Field of Classification Search

CPC ............... B66F 11/046; B66F 9/0655; G05B 2219/37434; G05B 2219/37435; B66C 13/066; B66C 23/00

See application file for complete search history.

(56) References Cited

U.S. PATENT DOCUMENTS

| | | | | |
|---|---|---|---|---|
| 2013/0295338 | A1* | 11/2013 | Keating | E04B 1/167 |
| | | | | 425/375 |
| 2017/0254102 | A1 | 9/2017 | Peters et al. | |
| 2021/0370509 | A1* | 12/2021 | Pivac | B25J 9/1694 |
| 2022/0411234 | A1* | 12/2022 | Vihonen | B66C 13/063 |
| 2023/0356402 | A1* | 11/2023 | Brulo | B25J 13/088 |
| 2025/0144753 | A1* | 5/2025 | Savarimuthu | B23K 9/127 |

FOREIGN PATENT DOCUMENTS

| | | |
|---|---|---|
| EP | 2 022 749 B1 | 6/2014 |
| JP | 2009-521630 A | 6/2009 |
| JP | 7014789 B2 | 2/2022 |
| KR | 10-0604017 B1 | 7/2006 |
| KR | 10-2018-0045549 A1 | 5/2018 |

OTHER PUBLICATIONS

Pertsch et al., "Modelling and Control of Coupled Bending and Torsional Vibrations of an Articulated Aerial Ladder", Mechatronics, vol. 33, Feb. 2016, pp. 34-48.

Yuan et al., "Motion Control of an Aerial Work Platform", Proceedings of the American Control Conference, Jun. 10-12, 2009, pp. 2873-2878.

Deng et al., "Lateral Vibration Behaviors of the Straight Boom of the Aerial Work Platform in the Horizontal Linear Motion", Automation in Construction, vol. 134, No. 2, 104095, Feb. 2022.

Zimmert et al., "2-DOF Control of a Fire-rescue Turntable Ladder", IEEE Transactions on Control Systems Technology, vol. 20, No. 2, Mar. 2012, pp. 438-452.

Staufer et al., "State Estimation on Flexible Robots Using Accelerometers and Angular Rate Sensors", Mechatronics, vol. 22, No. 8, Dec. 2012, pp. 1043-1049.

Keating et al., "Toward Site-specific and Self-sufficient Robotic Fabrication on Architectural Scales", Science Robotics, vol. 2, No. 5, 2017.

Petersen et al. ,"A Review of Collective Robotic Construction", Science Robotics, vol. 4, No. 28, 2019, 28 pages.

Li et al., "Survey and Introduction to the Focused Section on Mechatronics for Sustainable and Resilient Civil Infrastructure", IEEE/ASME Transactions on Mechatronics, vol. 18, No. 6, Dec. 2013, pp. 1637-1646.

Melenbrink et al., "On-site Autonomous Construction Robots: Towards Unsupervised Building", vol. 119, 103312, Nov. 2020.

Liu et al., "A Robotic System for Steel Bridge Maintenance: Research Challenges and System Design", ARC Centre of Excellence for Autonomous Systems, Jan. 2008, 8 pages.

Dai, Haihong, "Design of High-altitude Curtain Wall Cleaning Robot", Proceedings—2020 3rd World Conference on Mechanical Engineering and Intelligent, Dec. 2020, pp. 157-160.

Cho et al., "An Analysis Model for Wind Resistance Performance of Automated Exterior Wall Painting Robots in Apartment Buildings", KSCE Journal of Civil Engineering, vol. 18, 4, May 2014, pp. 909-919.

Yang et al., "Automated Wall-climbing Robot for Concrete Construction Inspection", Journal of Field Robotics, vol. 40, 2023, pp. 110-129.

Genie, "Genie", Terex Corporation, Online available at URL: https://www.genielift.com/en, retrieved on Feb. 7, 2025, 4 pages.

Ambrosino et al., "Constraint Control of a Boom Crane System", Proceedings of the 37th International Symposium on Automation and Robotics in Construction (ISARC), 2020, pp. 499-506.

Eusebio, Dustin, "8 Types of Construction Lifts and Their Uses", Bigrentz, Online Available URL: https://www.bigrentz.com/blog/types-of-construction-lifts, May 4, 2022, 13 pages.

Park et al., "Vibration Control of a Telescopic Handler Using Time Delay Control and Commandless Input Shaping Technique", Control Engineering Practice, vol. 12, No. 6, Jun. 2006, pp. 769-780.

Moon, Kee S., "Input Shaping Control for Suppression of Boom Vibrations", IEEE International Conference on Automation Science and Engineering, 2012, pp. 782-785.

Jia et al., "Using Input Shaping to Repress Two-mode Residual Vibration on Aerial Lifts", International Conference on Control, Automation and Systems, 2012, pp. 667-671.

Liu et al., "Vibration Control of the Boom System of Truck-Mounted Concrete Pump Based on Constant-Position Commandless Input Shaping Technique", Shock and Vibration, Article ID 420935, 2015, 9 pages.

Lin et al., "Iterative Learning Control for Vibration Suppression of a Robotic Arm", Applied Sciences, vol. 13, No. 828, Jan. 6, 2023, 17 pages.

Park et al., "Design of Learning Input Shaping Technique for Residual Vibration Suppression in an Industrial Robot", IEEE/ASME Transactions on Mechatronics, vol. 11, No. 1, Feb. 2006, 12 pages.

Cole et al., "A Direct Method of Adaptive FIR Input Shaping for Motion Control with Zero Residual Vibration", IEEE/ASME Transactions on Mechatronics, vol. 18, No. 1, 2013, pp. 316-327.

Nguyen et al., "A New Active Vibration Control Method on a Ladder of Turntable Ladders", Journal of Mechanical Science and Technology, vol. 35, No. 6, 2021, pp. 2337-2345.

Pucher et al., "Investigation of the Behavior of Vibration-Damped Flexible Link Robots in End-Effector Contact: Simulation and Experiment", Computational Methods in Applied Sciences, vol. 53, Jan. 2020, pp. 139-146.

Shang et al., "Vibration Suppression for Two-Inertia System With Variable-Length Flexible Load Based on Neural Network Compensation Sliding Mode Controller and Angle-Independent Method", IEEE/ASME Transactions on Mechatronics, vol. 28, No. 2, 2023, pp. 848-859.

Rappole, Jr., Bert Whitney, "Minimizing Residual Vibrations in Flexible Systems", MIT Artificial Intelligence Laboratory, May 21, 1992, 120 pages.

Thomsen et al., "Smooth Online Time-varying Input Shaping with Fractional Delay FIR Filtering", Control Engineering Practice, vol. 88, Jul. 2019, pp. 21-37.

Skogestad et al., "Multivariable Feedback Control Analysis and Design", IEEE Control Systems Magazine, Wiley, 2005, pp. 80-81.

Huang et al., "A New Approach to Identification of Structural Damping Ratios", Journal of Sound and Vibration, vol. 303, No. 1-2, 2007, pp. 144-153.

Mohammadpour et al., "Control of Linear Parameter Varying Systems with Applications", Springer, 2012, 554 pages.

Duan et al., "Control-Oriented Modeling for Flexible Aircraft", Journal of Aircraft, vol. 61, No. 1, 2024, pp. 183-195.

Duan et al., "A Limited-Preview Filtered B-Spline Approach to Tracking Control—With Application to Vibration-Induced Error Compensation of a 3D Printer", Mechatronics, vol. 56, Sep. 2017, pp. 287-296.

Chou et al., "A Physics-guided Data-driven Feedforward Tracking Controller for Systems with Unmodeled Dynamics Applied to 3D Printing", IEEE Access, vol. 11, Feb. 13, 2023, pp. 14563-14574.

Deng et al., "Lateral Vibration Behaviors of the Straight Boom of the Aerial Work Platform in the Horizontal Linear Motion", Automation in Construction, 2022, 104095.

Zhai et al., "An Adaptive Sampling Method for Kriging Surrogate Model with Multiple Outputs", Engineering Computations, vol. 38, (s1), 2022, pp. 277-295.

* cited by examiner 102A    102B    102C    102D    102E

200

End effector 208

$\mathcal{F}_E$

212E

206

212T $\mathcal{F}_T$

Tip 204

210

220

202

212G $\mathcal{F}_I$

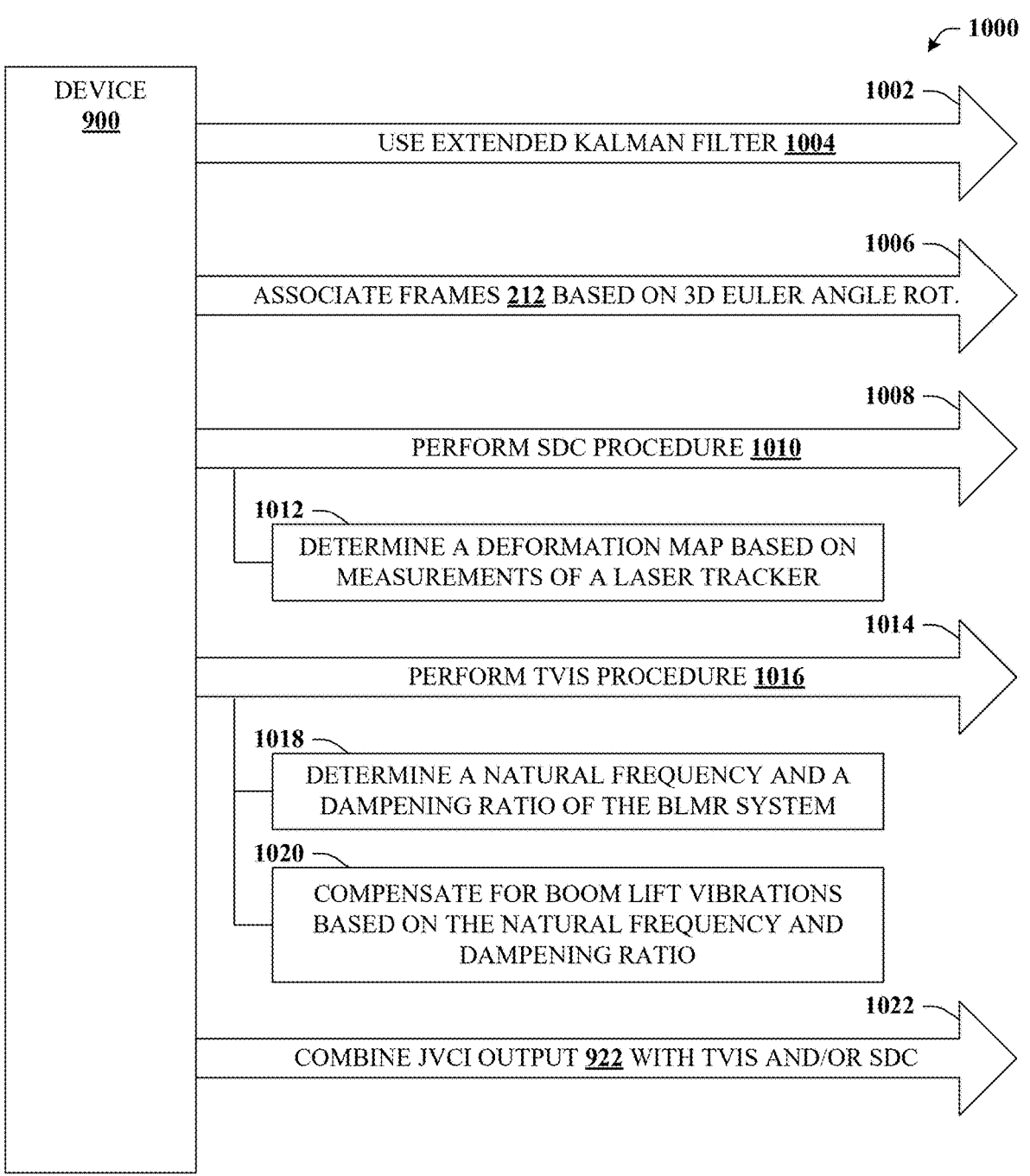

1000

DEVICE
900

1002
USE EXTENDED KALMAN FILTER 1004

1006
ASSOCIATE FRAMES 212 BASED ON 3D EULER ANGLE ROT.

1008
PERFORM SDC PROCEDURE 1010

1012
DETERMINE A DEFORMATION MAP BASED ON MEASUREMENTS OF A LASER TRACKER

1014
PERFORM TVIS PROCEDURE 1016

1018
DETERMINE A NATURAL FREQUENCY AND A DAMPENING RATIO OF THE BLMR SYSTEM

1020
COMPENSATE FOR BOOM LIFT VIBRATIONS BASED ON THE NATURAL FREQUENCY AND DAMPENING RATIO

1022
COMBINE JVCI OUTPUT 922 WITH TVIS AND/OR SDC

FIG. 10

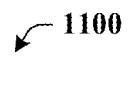

1100

START

RECEIVING, BY A DEVICE COMPRISING AT LEAST ONE PROCESSOR, INERTIAL MEASUREMENT UNIT (IMU) DATA FROM AN IMU DEVICE OF A BOOM LIFT MOUNTED ROBOT (BLMR) SYSTEM, WHEREIN THE IMU DEVICE IS SITUATED PROXIMAL TO A TIP OF A BOOM LIFT BEAM THAT SUPPORTS A ROBOT DEVICE COMPRISING AN END EFFECTOR   —1102

PERFORMING, BY THE DEVICE, A JACOBIAN-BASED VIBRATION COMPENSATION VIA IMU (JVCI) PROCESS CONFIGURED TO COMPENSATE FOR A VIBRATION EXHIBITED AT THE END EFFECTOR OF THE ROBOT DEVICE, WHEREIN THE JVCI PROCEDURE RECEIVES JVCI INPUT COMPRISING BLMR JOINT DATA AND THE IMU DATA, AND GENERATES JVCI OUTPUT INDICATIVE OF MOTION DUE TO THE VIBRATION   —1104

BASED ON THE JVCI OUTPUT, UPDATING, BY THE DEVICE, A POSITION OF THE END EFFECTOR TO COMPENSATE FOR THE VIBRATION   —1106

A         STOP

FIG. 11

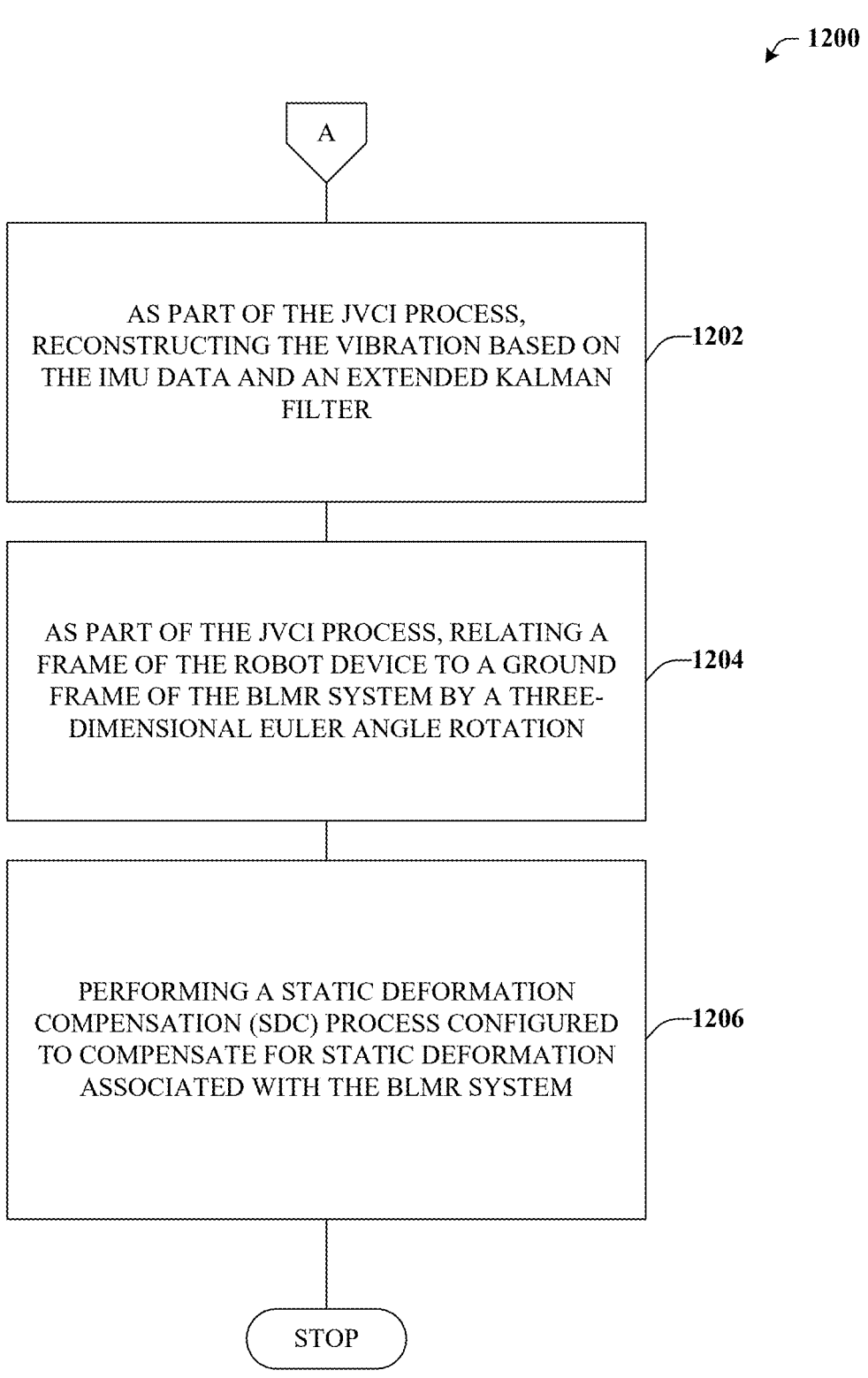

1200

A

AS PART OF THE JVCI PROCESS, RECONSTRUCTING THE VIBRATION BASED ON THE IMU DATA AND AN EXTENDED KALMAN FILTER ⟋1202

AS PART OF THE JVCI PROCESS, RELATING A FRAME OF THE ROBOT DEVICE TO A GROUND FRAME OF THE BLMR SYSTEM BY A THREE-DIMENSIONAL EULER ANGLE ROTATION ⟋1204

PERFORMING A STATIC DEFORMATION COMPENSATION (SDC) PROCESS CONFIGURED TO COMPENSATE FOR STATIC DEFORMATION ASSOCIATED WITH THE BLMR SYSTEM ⟋1206

STOP

FIG. 12

EXTENDABLE VARIABLE-STIFFNESS BOOM-LIFT-MOUNTED ROBOT WITH VIBRATION COMPENSATION

CROSS REFERENCE TO RELATED APPLICATION

This application is a nonprovisional application claiming priority to U.S. Provisional Patent Application No. 63/615, 786, filed on Dec. 29, 2023, entitled "Extendable Variable-Stiffness Boom-lift-mounted Robot with Vibration Compensation", the entirety of which priority application is hereby incorporated by reference herein in its entirety.

TECHNICAL FIELD

The following description relates generally to an extendable variable stiffness boom-lift-mounted robot (BLMR) system and, in particular, to determining and compensating for vibrations exhibited in the BLMR system.

BACKGROUND

Boom lifts are commonly utilized in various industries to provide safe and efficient access to elevated work areas. Recently, a boom-lift-mounted robot (BLMR) concept has been proposed, combining a boom lift and an industrial robot to facilitate enhanced levels of construction automation. Thus, the robot can be employed to perform tasks that were traditionally performed by human laborers such as, for example, construction, cleaning, inspection, or repair.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 10 depicts a schematic block diagram illustrating additional aspects or elements of the example device that can utilize JVCI techniques to compensate for vibrations exhibited in a BLMR system in accordance with certain embodiments of this disclosure;

FIG. 11 illustrates an example method that can utilize JVCI techniques, potentially in combination with other techniques, to compensate for vibrations exhibited in a BLMR system in accordance with certain embodiments of this disclosure;

FIG. 12 illustrates an example method that can provide additional aspects or elements relating to utilizing JVCI techniques to compensate for vibrations exhibited in a BLMR system in accordance with certain embodiments of this disclosure.

DETAILED DESCRIPTION

Overview

Figure 1:
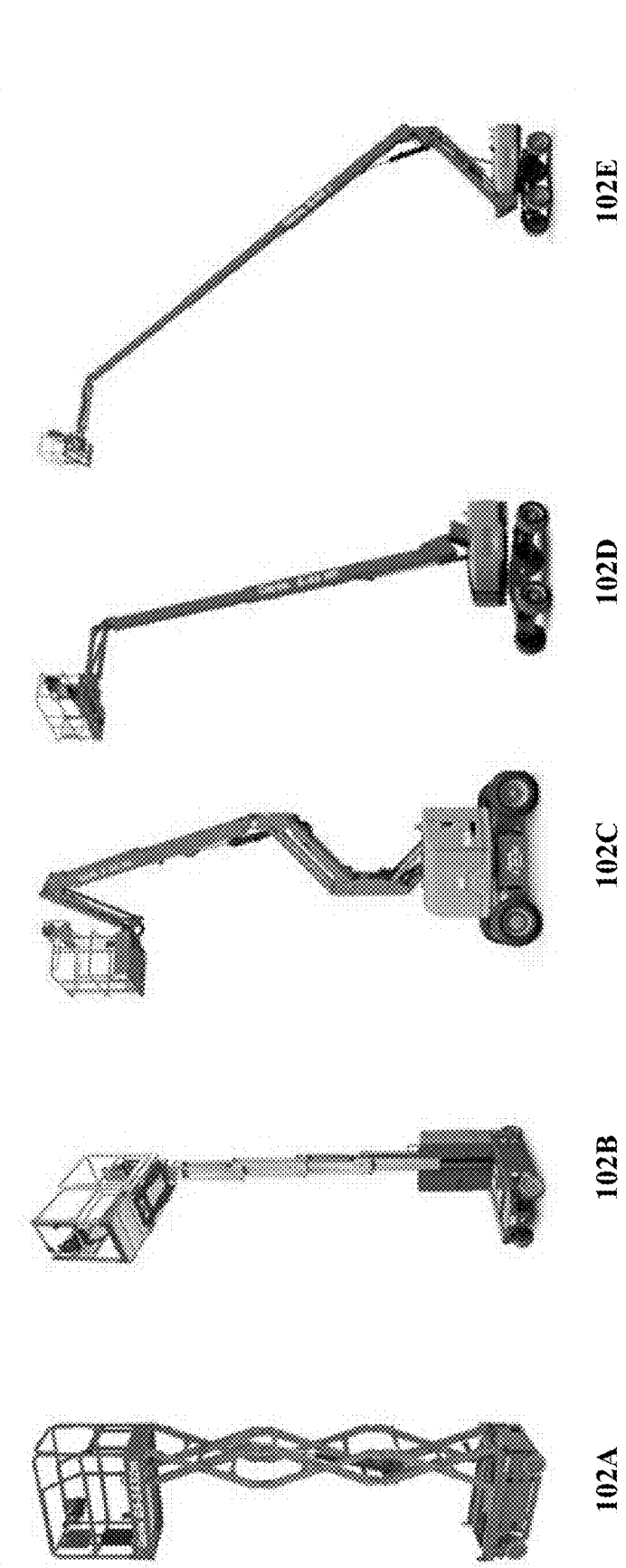
FIG. 1 illustrates several different types of boom lifts in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As introduced above, construction robots are increasingly being adopted in the modern construction industry due to rapid urbanization, workforce shortages, safety concerns, and potential applications in extraterrestrial habitats. Among various construction tasks such as site preparation (e.g., substructure preparation, superstructure preparation, . . . ), construction surface work is a labor-intensive and time-consuming process, characterized by the frequent need for maintenance. Automating construction surface work poses significant challenges due to dynamic environmental disturbances, interaction forces, and diverse external wall layouts. Furthermore, boom lifts typically contain extendable large-scale, variable-stiffness structures, subject to complex non-linear static deformation and dynamic motion/gust-induced vibrations. These issues hinder the BLMR's precise and safe operation.

To address these challenges, representative construction surface work automation platforms, including quadcopters, exterior wall robots, and climbing robots, have been proposed. Exterior wall robots mostly add robotic manipulators to a hanging basket. Exterior wall robots are generally a low-cost automation solution, but typically limited to a flat wall without obstacles such as a balcony or the like. The climbing robot is designed for nondestructive evaluation tasks like inspection with a low payload. Quadcopters can quickly fly over unstructured terrain but have limited payload and short endurance. To address these abovementioned challenges, recent investigations have proposed combining the industrial robot with a boom lift, which can represent a universal construction surface work platform.

With initial reference to FIG. 1, illustrated are several different types of boom lifts in accordance with certain embodiments of this disclosure. For example, boom lift 102A is an example of a scissor lift. Boom lift 102B is an example of a vertical mast lift. Boom lift 102C is an example of an articulating lift. Boom lift 102D is an example of a telescopic lift. Boom lift 102E is an example of a telescopic articulating lift.

Boom lifts 102 (e.g., boom lifts 102A-102E or another suitable type of boom lift), are the most commonly exploited high-altitude platform, and can be efficiently deployed to accommodate complex construction surface environments and tasks. Currently, boom lifts 102 are operated by construction workers to reach designated heights for maintenance, cleaning, repairing, and inspection work, as shown in FIG. 1. Boom lifts 102, based on the structure extension types, are classified as scissor lifts, vertical mast lifts, telescopic lifts, articulating lifts, and associated hybrid combinations. Among the exemplary types of boom lifts 102, the scissor lift 102A and vertical mast lift 102B provide only vertical motion and are relatively easy to control. These two types of boom lifts 102 are typically exploited for low-altitude elevation.

Telescopic boom lifts 102D and 102E and their variants can provide the potential to cover a large range of operating altitudes. Also, telescopic boom lifts are the most representative platform for potential boom-lift-mounted-robot (BLMR) automation. However, telescopic boom lifts can suffer significantly from vibrations due to the extendable long beam. The variable stiffness feature of extendable beams is widely observed in different applications (e.g., cranes, aerial ladders, and space structures. Due to motion and external gust disturbance, the long-beam extension generates variable-frequency structural vibrations, which can be challenging for existing control techniques for robot-mounted devices that rely on precision positioning and/or movement of the end effector. To investigate these vibration features, a telescopic lift is selected as a representative example of a boom lift platform for the remainder of this disclosure. However, it is appreciated that the disclosed techniques can apply to any type of boom lift 102.

Hence, to automate construction surface work, this disclosure investigates the vibration compensation of a boom-lift-mounted robot (BLMR) system. The characteristic extension-dependent static and vibration dynamics of BLMR are addressed with systematic combinations of static deformation compensation and Jacobian-based vibration compensation via inertial measurement unit feedback. To verify the methods, a BLMR prototype is designed and built, with its extension-dependent static error and vibration characteristics experimentally identified. The performances of the proposed vibration compensation methods are compared to a time-varying input shaping method to illustrate enhanced tracking performance under motion-induced BLMR vibration.

Example Systems

Figure 2:
FIG. 2 illustrates an example boom-lift-mounted robot (BLMR) system in which a vibration in the boom lift can lead to undesired motion of the robot end effector in accordance with certain embodiments of this disclosure.

Referring now to FIG. 2, illustrated is an example boom-lift-mounted robot (BLMR) system 200 in which a vibration in the boom lift can lead to undesired motion of the robot end effector in accordance with certain embodiments of this disclosure. As readily appreciated, BLMR system 200 can comprise a boom lift 202 (e.g., any boom lift 102 or other suitable boom lift). Boom lift 202 can comprise a tip 204 that is extendable and can be suitable for mounting robot 206. Robot 206 can comprise end effector 208. End effector 208 can also be referred to as an end-of-arm tooling (EOAT) element, and can be the device attached to the end of a robotic arm. End effector 208 can represent the part of the robot that interacts with the environment, performing tasks such as grasping, manipulating, or processing objects. The end effector 208 can serve as the "business end" of the robot, enabling it to execute specific operations.

End effector 208 can therefore vary greatly depending on the application or task requirements. For example, end effector 208 can comprise or represent a gripper to grasp or hold objects, welding tools such as electrodes for arc welding or other metal joining processes, spray systems such as nozzles or pumps that dispense fluid, or other specialized tools for example for cutting, sanding, drilling, and so forth.

Unfortunately, vibrations exhibited in BLMR system 200 can adversely affect a position and/or cause undesired motion at end effector 208, which can negatively impact the operation being performed by robot 206. Numerous techniques have been examined in order to compensate for these vibrations.

For example, early investigations for structural vibration alleviation in boom lift structures exploit a feedforward method. For instance, it has been proposed to use an input shaping control method to suppress the boom lift vibrations. Such methods were further extended to a commandless input shaping technique (CIST) to alleviate the vibration during unloading. Other techniques considered relate to the development of a two-mode zero-vibration input shaper to suppress the endpoint vibration considering multiple modes. To account for the model uncertainty and disturbances, certain techniques adopted a combination of feedforward CIST and feedback to suppress the vibrations. However, these aforementioned methods are limited as they have not taken the parameter-varying vibration characteristics into consideration, which can be a significant issue.

Recent investigations have focused on vibration compensation with structure frequencies that change with different configurations. For example, certain techniques can rely on a time-varying input shaper (TVIS) to reduce the vibration of the boom lift system considering the extension beam. To enhance the robustness of the vibration compensation methods, feedback control can also be introduced to alleviate the boom lift vibrations. Other proposals can relate to a PD controller via the feedback of rotational angle measurement of each segment to reduce the vibration based on the dynamic model established with modal parameters. Furthermore, certain techniques have established the infinite-dimensional model of the telescopic boom lift and utilized the observer-based state feedback controller with information from strain gauges and gyroscopes. Such can be further combined with other techniques in which the state feedback control is based on the Euler-Bernoulli beam model with feedforward control to alleviate the vibration of the telescopic boom lift. However, these methods either require the modal parameters or only target a certain type of configuration.

Robotic-based vibration compensation methods are relatively mature but mostly address scenarios where the robots are mounted on a stationary foundation. Some techniques used the feedforward and classic feedback control combined with state estimation using angular rate and acceleration sensors to suppress the vibration. Other techniques proposed a neural network compensation sliding mode controller with a 2D beam model to suppress the vibration of a two-inertia system with variable-length flexible load. Iterative learning input shaping with accelerator feedback and adaptive finite impulse response input shaping using the strain gauge have been proposed to suppress the vibration. However, these robotic-based vibration compensation methods are limited in the BLMR scenarios since they either apply to the rotational joints or target repeatable works.

Recently the laser-tracker-based feedback control method (e.g., laser tracker 220) has been proposed to alleviate the BLMR vibration, but the direct use of laser tracker measurement as feedback is expensive and prone to potential laser beam blocking during complex tasks. Therefore, a new feedback approach combining static deformation compensation and dynamic vibration compensation via inertial measurement unit (IMU) 210 feedback is proposed in this disclosure to solve the extension-dependent vibration issues and/or challenges. Compared with other solutions, the proposed method can utilize a robot manipulator (e.g., robot 206) and IMU 210 mounted on the tip 204 of the general extendable beam structure for boom lift 202, and can exploit robot manipulation for vibration compensation with no restrictions on joint types of extendable beam structures, no limitations on the type of robot manipulator on the tip (with enough redundancy), and no prior knowledge of modal parameters while automating the construction surface work.

In that regard, the disclosed techniques can generally relate to a feedback vibration compensation method in which Jacobian-based vibration compensation via IMU 210 (JVCI) feedback is proposed to account for the extension-dependent vibration in general BLMR-type structures with a linear parameter varying system stability proof.

Furthermore, a representative telescopic BLMR (e.g., BLMR 200) capturing the extension-dependent vibration features can be designed and built with an integrated electrical control system. Hence, the proposed techniques can be verified in experiments with multidimensional analysis of vibration to show enhanced tracking accuracy and vibration alleviation, in contrast to the time-varying input shaping method, which is further detailed below.

More specifically, this disclosure is organized by sections to allow increased understanding. In that regard, a first section is provided below relating to the vibration compensation of BLMR 202, including the static deformation compensation, time-varying input shaping methods, and Jacobian-based vibration compensation via IMU feedback with stability proof. A second section is subsequently provided discusses the BLMR design and experimental case studies to evaluate the proposed techniques, followed by a conclusions section.

Vibration Compensation of an Example BLMR

With regard to the kinematics of a telescopic BLMR, consider a general BLMR configuration (e.g., BLMR 200)

combining $n_a$ electrical/pneumatic cylinders with a robotic manipulator with $n_r$ joints, the boom lift actuator extension can be defined as $$d = \{d_1, d_2, \dots, d_{n_a}\}^T, \tag{1}$$

the robot joints can be defined as $$q = \{q_1, q_2, \dots, q_{n_r}\}^T, \tag{2}$$

and the overall BLMR states can be defined as $$h = \{d^T, q^T\}^T. \tag{3}$$

Define the inertial frame $F_I$ 212G attached to the ground, the body-fixed frame $F_T$ 212T attached to the tip 204, and the body-fixed frame $F_E$ 212E attached to the end effector 208 of the robotic manipulator, as shown in FIG. 2. We can define the boom-lift-robot connection point $p_t(d)$, and the robot's end effector position $p_e(d, q)$, and the rotation Euler angle of the end effector 208 (following ZYX rotation) can be given by $\vartheta_e \in \mathbb{R}^3$. The BLMR 200 state velocity connects to the end effector velocity and angular velocity with the Jacobian matrix J, i.e., $$\left\{ \begin{matrix} \dot{p}_e \\ \dot{\vartheta}_e \end{matrix} \right\} = \underbrace{\left[ \begin{matrix} \dfrac{\partial p_e}{\partial h} \\ {}_1^0 Rz \; {}_2^0 Rz \; \dots \; {}_{n_r+n_a}^0 Rz \end{matrix} \right]}_{\triangleq J} \dot{h}, \tag{4}$$

where z can be the unit vector $\{0\ 0\ 1\}^T$ along the local Z-direction for rotational joints and the zero vector $\{0\ 0\ 0\}^T$ for prismatic joints, and $${}_i^0 R$$

can be the rotation matrix from the frame corresponding to the $i^{th}$ actuator to the ground frame $F_I$. The forward kinematics is given by (4). It is noted that the BLMR 200 state is typically larger than six degrees of freedom due to their combination of the boom lift and the robot degrees of freedom (DOFs). Therefore, the corresponding inverse kinematics can be redundant and cannot be uniquely defined. The inverse kinematics Q is a standard quadratic programming problem with linear constraints, given by $$\delta h = W^{-1} J^T \left( J W^{-1} J^T \right)^{-1} \{\delta p_e^T, \delta \vartheta_e^T\}^T, \tag{5}$$

where $\delta h$, $\delta p_e$, and $\delta \vartheta_e$ can be the local perturbations around the states, and W can be the positive definite weight matrix. Apart from the Jacobian of the robot end effector 208, the Jacobian of the boom lift tip 204 point can also be significant or crucial as it accounts for the significant deviations due to the long beam deflections. To account for the nonlinear static deformation, the static error at the tip 204 can be measured with a laser tracker 220, as shown in FIG. 2, and can be defined as $\bar{e}_t(d)$. Exploiting the low-frequency nature of the deformation, the static deformation map can lead to the generation of the compensated boom lift actuator input δd, given by $$\delta d = J_t^{\dagger} \bar{e}_t, \quad J_t = \frac{\partial p_t}{\partial d}, \tag{6}$$

where $$J_t^{\dagger}$$

can be the right pseudoinverse of $J_t$. The static deformation compensation S(d) can be given by $$d = d_r + \delta d, \tag{7}$$

where $d_r$ can be the desired boom lift actuator extension.

With regard to Jacobian-based vibration compensation via IMU 210 feedback, the motion of the BLMR 200 introduces vibrations to the end effector 208 due to the flexibility of the boom lift 202. A comprehensive compensation scheme embracing different controllers is shown in FIG. 3.

Figure 3:
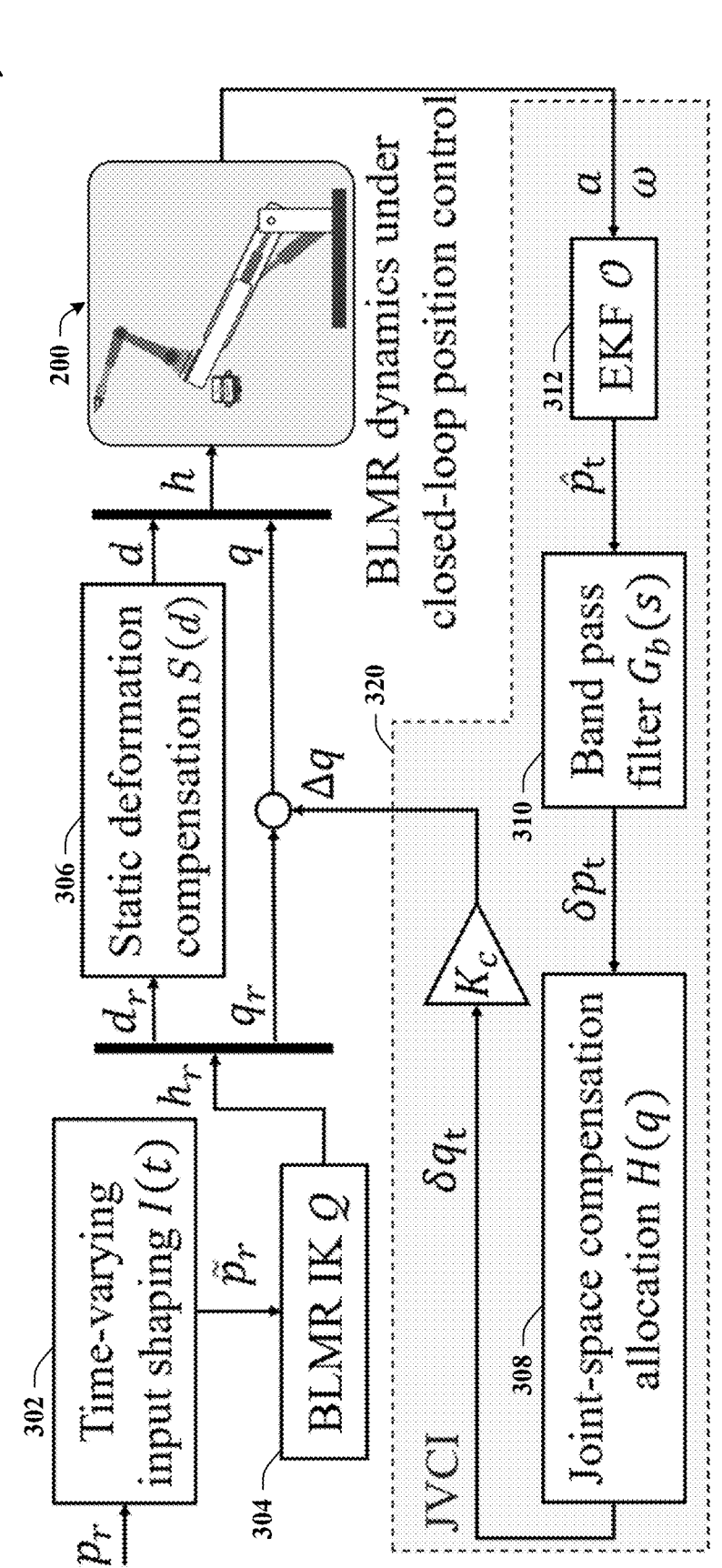
FIG. 3 depicts a schematic block diagram illustrating a comprehensive vibration compensation scheme that can combine multiple techniques including both feedforward and feedback techniques in accordance with certain embodiments of this disclosure.

Turning now to FIG. 3, a schematic block diagram 300 is depicted illustrating a comprehensive vibration compensation scheme that can combine multiple techniques including both feedforward and feedback techniques in accordance with certain embodiments of this disclosure.

As illustrated, as part of the feedforward elements, one or more TVIS technique 302 can be employed as well as a BLMR IK technique 304 and a static deformation compensation technique 306. It can be appreciated that static deformation can be compensated with a deformation map to enhance the trajectory accuracy, which is further detailed below. Further, vibration can be accounted for using one or more JVCI techniques 320 that can be implemented via feedback. JVCI techniques 320 can comprise a joint-space compensation allocation technique 308, a band pass filter technique 310, and an extended Kalman filter (EKF) technique 312. Hence, the JVCI techniques 320 can be used to reconfigure certain feedforward techniques 302, 304, and/or 306.

Among the feedforward vibration suppression methods targeted for extension-dependent vibration characteristics, certain TVIS techniques 302 can yield effective results to alleviate the extension-dependent vibration. For instance, assume the natural frequency $\omega_n(d)$ and the damping ratio $\xi(d)$ of the BLMR 200 are known as a nonlinear function of the beam extension. In the implementation of TVIS, the natural frequency and damping ratio are scheduled with time, and this time-varying input shaping filter I(t) can be $$I(t) = \frac{1}{1+L(t)}u(t) + \frac{L(t)}{1+L(t)}u(t - T_I(t)), \tag{8}$$

where u(t) can be the impulse signal, $T_I(t)$ and L(t) can be the time-varying time shift and ratio between impulses given by $$T_I(t) = \frac{\pi}{\omega_n(t)\sqrt{1-\xi(t)^2}}, \tag{9}$$

$$L(t) = e^{\left(\frac{-\xi(t)\pi}{\sqrt{1-\xi(t)^2}}\right)}.$$

The reference trajectory of the end effector $p_r(t)$ can be convolved with I(t) to get the modified reference $\tilde{p}_r(t)$ as $$\tilde{p}_r(t) = \frac{1}{1+L(t)}p_r(t) + \frac{L(t)}{1+L(t)}p_r(t - T_I(t)). \tag{10}$$

The reference trajectory $p_r(t)$ can be assumed to have a sufficient constant ending portion to avoid steady-state error.

To suppress the vibration problems in real-time without prior knowledge of the natural frequency and damping ratio of BLMR, Jacobian-based vibration compensation via IMU feedback such as JVCI techniques 320 are proposed. To compensate for these vibrations, it is assumed that an IMU 210 is attached to the bottom of the boom lift tip 204 as shown in FIG. 2, but other arrangements are of course possible. This arrangement arises from the fact that the extendable long boom lift arms contribute to the major structural flexibility that needs to be accurately captured. The robotic manipulator is significantly stiffer and assumed to be following rigid-body motion. The overall BLMR states $h=\{d^T, q^T\}^T$ can be executed by the position controller of the actuator with a P-PI structure. The vibration at the tip 204 can be expected to be compensated for with the robotic manipulator, given by $$q = q_r + \Delta q, \tag{11}$$

where $q_r$ can be the desired robot joint input and $\Delta q$ can be the incremental joint movement to compensate for the vibration. Therefore, the joints' dynamic contribution can be established. We assume that the vibration structural modes depend on the boom lift actuator extension state, d, and thus model the dynamic system as a linear parameter varying system defined as $G_o(s; d)$, where s can be the Laplace variable while the multi-dimensional d can be a slowly varying parameter deciding the local vibration characteristics. The input and output of the system can be the joint movement $q_i(t)$, and the acceleration a(t) and angular velocity $\omega(t)$ from IMU measurement, respectively, such that $$\{A_t^T(s), \Omega_t^T(s)\} = G_o(s; d)Q(s), \tag{12}$$

where Q(s), $A_t(s)$ and $\Omega_t(s)$ can be the Laplace transform of $q_i(t)$, a(t) and $\omega(t)$.

The vibration of the tip 204 can be reconstructed via IMU 210 measurement with an extended Kalman filter (EKF) technique 312. The body-fixed frame $F_T$ can be related to the inertial frame $F_I$ 212G by a ZYX Euler angle rotation (defined as $\vartheta_t \in \mathbb{R}^3$, $\vartheta_t = \{\phi \ \theta \ \psi\}^T$). The velocity of the tip 204 can be given by $v \in \epsilon^3$. The dynamic model of IMU can be defined as $$\begin{aligned} \dot{\vartheta}_t &= C(\vartheta_t)\omega \\ \dot{v} &= a - \omega \times v - R(\vartheta_t)g \end{aligned}, \tag{13}$$

where $C(\vartheta_t)$ is defined as $$C(\vartheta_t) = \begin{bmatrix} 1 & \frac{s_\phi s_\theta}{c_\theta} & \frac{c_\phi s_\theta}{c_\theta} \\ 0 & c_\phi & -s_\phi \\ 0 & \frac{s_\phi}{c_\theta} & \frac{c_\phi}{c_\theta} \end{bmatrix}, \tag{14}$$

and $R(\vartheta_t)$ is defined as $$R(\vartheta_t) = \begin{bmatrix} c_\theta c_\psi & c_\theta s_\psi & -s_\theta \\ s_\phi s_\theta c_\psi - c_\phi s_\psi & s_\phi s_\theta s_\psi + c_\phi c_\psi & s_\phi c_\theta \\ c_\phi s_\theta c_\psi + s_\phi s_\psi & c_\phi s_\theta s_\psi - s_\phi c_\psi & c_\phi c_\theta \end{bmatrix}, \tag{15}$$

where $s_\kappa = \sin(\kappa)$ and $c_\kappa = \cos(\kappa)$ ($\kappa = \phi, \theta, \psi$). Given the IMU model (13) to predict $\hat{\vartheta}_t$, $\hat{v}$ and $\hat{p}_t$, the EKF O are defined as $$\begin{Bmatrix} \dot{\hat{\vartheta}}_t \\ \dot{\hat{v}} \\ \dot{\hat{p}}_t \end{Bmatrix} = \begin{Bmatrix} C(\hat{\vartheta}_t)\omega \\ a - \omega \times \hat{v} - R(\hat{\vartheta}_t)g \\ \hat{v} \end{Bmatrix} + L(\hat{\vartheta}_t - \vartheta_t), \tag{16}$$

where L can be the observer matrix. With estimated $\hat{p}_t$, the tip vibration $\delta p_t$ in the body-fixed frame $F_T$ 212T after the band pass filter system $G_b(s)$ can be defined as $$\delta p_t = R_T(\vartheta_t)^T \mathcal{L}^{-1}[G_b(s)(\hat{P}_t(s) - P_t(s))], \tag{17}$$

where $R_T(\vartheta)$ can be the rotation matrix from the inertial frame $F_I$ to the body-fixed frame $F_T$, $G_b(s)$ can be utilized to eliminate the drift, and $\hat{P}_t(s)$ and $P_t(s)$ can be the Laplace transform of the estimated tip position $\hat{p}_t$ and the reference tip position $p_t$ respectively. The response of the industrial robot 204 can be assumed to be faster than that of the boom lift 202. High-frequency vibration can be compensated with a robot manipulator and the vibration of the end effector 208 can be alleviated even if there exists a large vibration at the tip 204. Optimization-based allocation is proposed to reduce the vibration induced by each joint based on the criteria of minimum joint movement and change of mass center. The tip 204 vibration $\delta p_t$ can be compensated via the incremental joint movement $\delta q_t$ by solving the optimization problem H(q), defined as $$H = \min_{\delta q_t} [w_1 \|\delta p_c\|_2 + w_2 \|\delta q_t\|_2], \text{ s.t. } \delta p_t = J_r \delta q_t, \tag{18}$$

where $w_1$ and $w_2$ can be the weights, $J_r$ can be the Jacobian matrix of the robot manipulator, and $\delta p_c$ can be the change of the robot center of mass defined as $$\delta p_c = \frac{\partial f_m}{\partial q} \delta q_t, \tag{19}$$

where $f_m(\bullet)$ can calculate the mass center of the robot manipulator. With this optimization problem solved, the incremental joint movement is given by $$\Delta q = K_c \delta q_t, \tag{20}$$

where $K_c$ can be the feedback gain. The allocation of the incremental movement of $\delta p_t$ to each joint affects the vibration performance since the joints' dynamic contribution can differ from each other. Optimization-based allocation via (18) is proposed to reduce the vibration induced by each joint.

The feedback stability of certain JVCI techniques 320 may significantly depend on the design of $K_c$. The EKF techniques 312 and robot joint-space compensation allocation techniques 308 can be linearized as $G_e(s; d)$ and $G_a(d)$. The vibration at the tip can be typically significantly faster than its nominal motion (e.g., planned trajectory with only d). Therefore, the stability of the system is analyzed from a conventional linear-parameter-varying (LPV) system framework with d as the scheduling parameter.

For example, define the overall open-loop system as $$G(s; d) = K_c G_a(d) G_b(s) G_e(s; d) G_o(s; d). \tag{21}$$

The stability of the system can be guaranteed by a generalized Nyquist theorem for the multiple-input multiple-output (MIMO) system, where $G(j\omega; d)$ can be experimentally measured. Let $P_{ol}$ denote the number of open-loop unstable poles in the open-loop MIMO transfer function matrix G(s; d). In some cases, the closed-loop system is stable if and only if the Nyquist plot of det(I+G(s; d)) makes $P_{ol}$ anti-clockwise encirclements of the origin and does not pass through the origin. For the typically open-loop stable BLMR system, this theorem demands no origin encirclements of the det(I+G(s; d)).

Experiments on a BLMR Prototype

Figure 4:
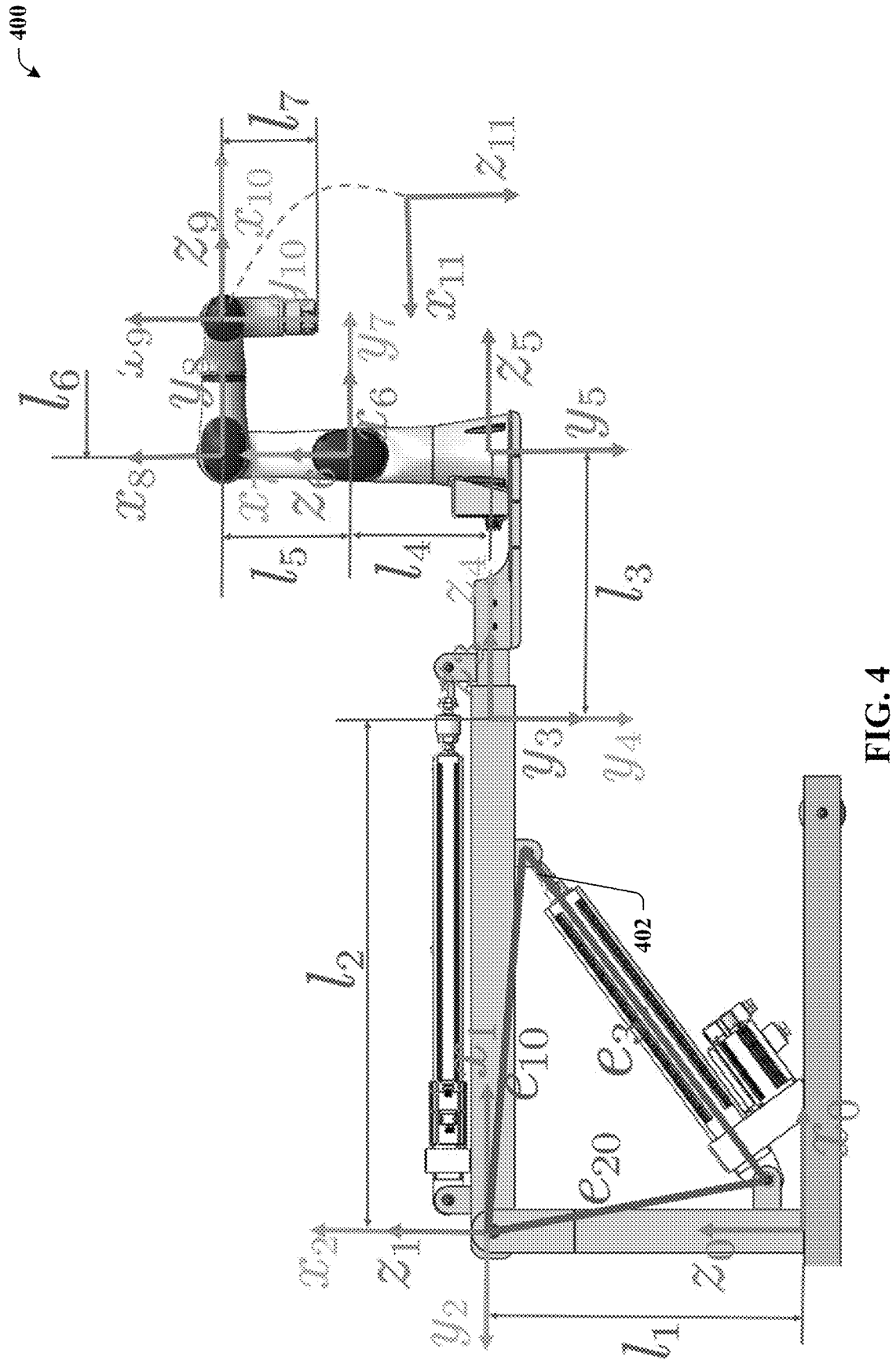
FIG. 4 depicts a diagram of an example prototype BLMR system 400 in accordance with certain embodiments of this disclosure.

With regard to design and hardware setup, in order to verify the proposed techniques and/or methods, a scaled BLMR prototype is designed and built by combining a telescopic boom lift and a Huashu HSR-Co603 collaborative robot, as shown in FIG. 4.

FIG. 4 depicts a diagram of an example prototype BLMR system 400 in accordance with certain embodiments of this disclosure. In this example arrangement, the boom lift's two joints are actuated by two electromechanical cylinders (EMCs) driven by Panasonic MSMF302L1H6M and MSMF082L1V2M servo motors. A Jobrey Tech IMU, with an acceleration resolution of 0.0002 g and angular speed resolution of 0.01°/s, is attached to the tip of the boom lift for real-time feedback. The robot joints, EMCs, and IMU are all controlled and sensed in real-time with the Beckhoff TwinCAT system via EtherCAT and RS485 communications with a 1 kHz sampling rate. The vibration or deformation is measured by FARO Vantage$^{E6}$ Max laser tracker with a distance resolution of 50 μm, shown in FIG. 2. The detailed specifications of the BLMR prototype are listed in TABLE I.

TABLE I

| SPECIFICATIONS OF THE BLMR PROTOTYPE | | | |
|---|---|---|---|
| Load (kg) | 3 | | |
| Vertical range (m) | 0.4-3.5 | | |

| Motion range of d(m) and q(°) | | | |
|---|---|---|---|
| $d_1$ | $d_2$ | $q_1$ | $q_2$ |
| 0-0.4 | 0-0.7 | $-180\text{\textasciitilde}180$ | $-120\text{\textasciitilde}120$ |
| $q_3$ | $q_4$ | $q_5$ | $q_6$ |
| $-140\text{\textasciitilde}140$ | $-180\text{\textasciitilde}180$ | $-130\text{\textasciitilde}130$ | $-180\text{\textasciitilde}180$ |

| Maximum speeds of $\dot{d}_m$ (m/s) and $\dot{q}_m$ (°/s) | | | | | | | |
|---|---|---|---|---|---|---|---|
| $\dot{d}_{1m}$ | $\dot{d}_{2m}$ | $\dot{q}_{1m}$ | $\dot{q}_{2m}$ | $\dot{q}_{3m}$ | $\dot{q}_{4m}$ | $\dot{q}_{5m}$ | $\dot{q}_{6m}$ |
| 0.15 | 0.25 | 120 | 90 | 90 | 240 | 240 | 240 |

With regard to kinematic modeling, the schematics of the prototype BLMR system 400 are shown in FIG. 4 and triangle 402 illustrates the initial configuration of BLMR. The length of each side of the blue triangle at the initial configuration can be denoted as $e_{10}$, $e_{20}$, and $e_{30}$. For ease of calculation, the movement of $d_1$ can be converted to the rotation of the link $q_{d1}$ as $$q_{d1} = \cos^{-1}\left((e_{10}^2 + e_{20}^2 - e_3^2)/2e_{10}e_{20}\right) - \alpha, \qquad (22)$$

$$\alpha = \cos^{-1}\left((e_{10}^2 + e_{20}^2 - e_{30}^2)/2e_{10}e_{20}\right),$$

$$e_3 = e_{30} + d_1.$$

In the given motion ranges, $d_1$ and $q_{d1}$ formulate a bijection and $d_1$ can be recovered from $g_{d1}$ with $$d_1 = \sqrt{e_{10}^2 + e_{20}^2 - 2\cos\left(q_{d1} + \alpha\right)e_{10}e_{20}} - e_{30}. \qquad (23)$$

The variable set can be rewritten as $$\tilde{h} = \{q_{d1} \quad d_2 \quad q_1 \quad q_2 \quad q_3 \quad q_4 \quad q_5 \quad q_6\}^\top. \qquad (24)$$

The detailed Denavit-Hartenberg (DH) frames of the BLMR are illustrated in FIG. 4 and the DH table is shown in TABLE II below. The overall transformation matrix from the ground to the end effector frame can be given by $$T = T_1 T_2 T_3 T_4 T_5 T_6 T_7 T_8 T_9 T_{10} T_{11}. \qquad (25)$$

The position of the end effector is $$p_e = Tl, \qquad (26)$$

where l is the tool in the end effector frame. J is given by $$J = \begin{bmatrix} \dfrac{\partial p_e}{\partial \tilde{h}} \\ {}_2^0Rz_1 \quad z_0 \quad {}_6^0Rz_1 \quad {}_7^0Rz_1 \quad {}_8^0Rz_1 \quad {}_9^0Rz_1 \quad {}_{10}^0Rz_1 \quad {}_{11}^0Rz_1 \end{bmatrix}, \qquad (27)$$

where $z_1 = \{0\ 0\ 1\}^T$ is for the rotational joints, and $z_0 = \{0\ 0\ 0\}^T$ is for the prismatic joints.

TABLE II

| DENAVIT-HARTENBERG TABLE OF THE BLMR | | | | |
|---|---|---|---|---|
| i | $\alpha_{i-1}$ | $a_{i-1}$ | $d_i$ | $\theta_i$ |
| 1 | 0 | 0 | $l_1$ | 0 |
| 2 | $\pi/2$ | 0 | 0 | $\pi/2 + q_{d1}$ |
| 3 | $\pi/2$ | 0 | $l_2$ | $\pi/2$ |
| 4 | 0 | 0 | $d_2$ | 0 |
| 5 | 0 | 0 | $l_3$ | 0 |
| 6 | $\pi/2$ | 0 | $l_4$ | $\pi/2 + q_1$ |
| 7 | $-\pi/2$ | 0 | 0 | $q_2 - \pi/2$ |
| 8 | 0 | $l_5$ | 0 | $q_3$ |
| 9 | $-\pi/2$ | 0 | $l_6$ | $q_4$ |
| 10 | $\pi/2$ | 0 | 0 | $\pi/2 + q_5$ |
| 11 | $-\pi/2$ | 0 | 0 | $\pi + q_6$ |

To enhance end effector positioning, static deformation compensation is first exploited. With the robot standing on the tip, the EMC extension $d_1$ and $d_2$ are sampled with a 50 mm spacing to formulate a sampling grid, where $d_1$ starts from 0 to 400 mm and $d_2$ is from 0 to 700 mm. With the laser tracker measurement, the static deformation map of the boom lift tip can be generated automatically via designed software, as presented in FIG. 5.

Figure 5:
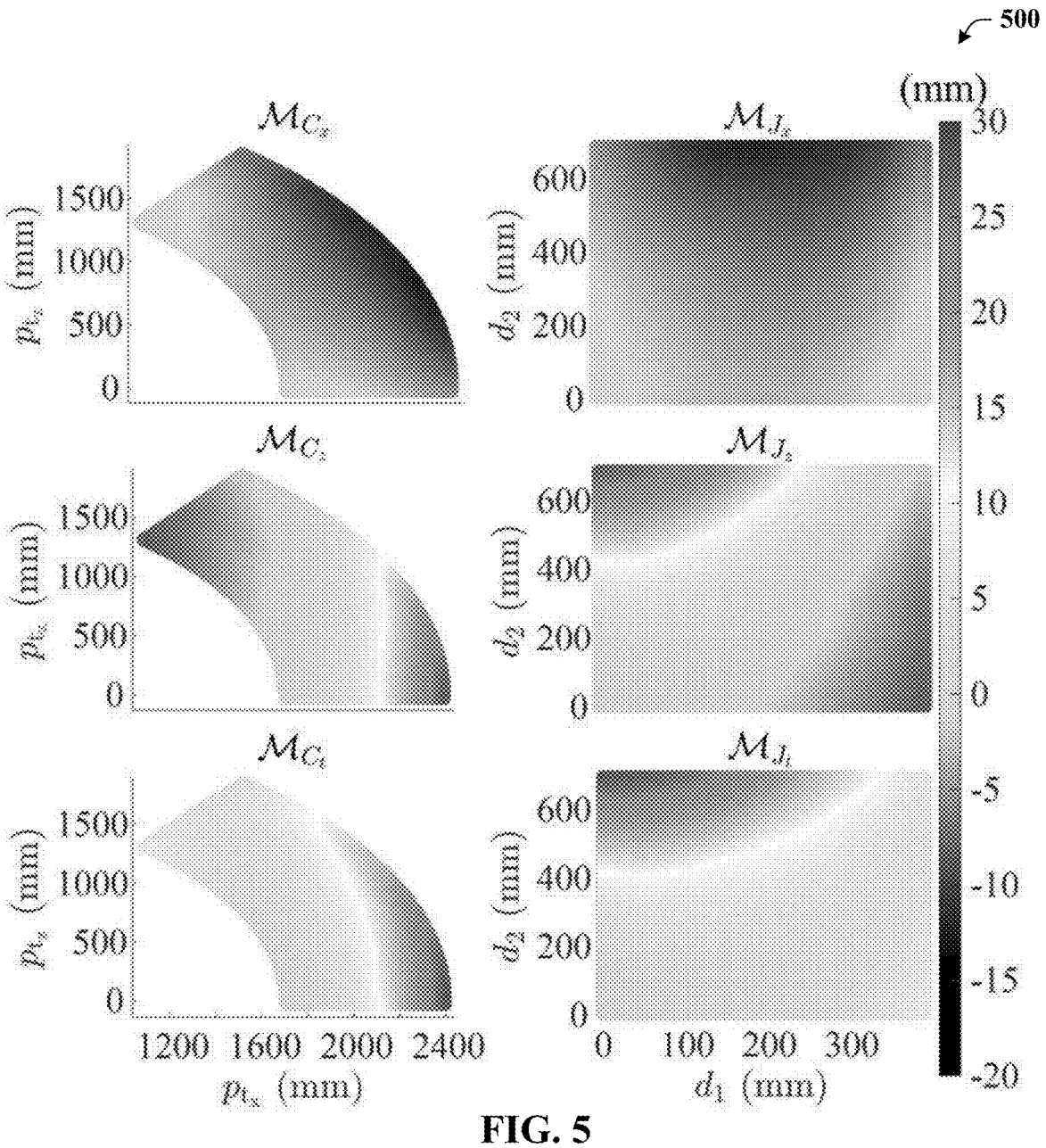
FIG. 5 depicts a diagram showing an example static deformation map in the work and joint space in accordance with certain embodiments of this disclosure.

FIG. 5 depicts a diagram 500 showing of an example static deformation map in the work and joint space in accordance with certain embodiments of this disclosure. It is noted that this deformation is typically a smooth nonlinear function. Therefore, even for high-dimensional deformation maps of full-scale boom lifts with more degrees of freedom and uncertain payload, adaptive meshing techniques and surrogate models could be exploited to reduce the number of required samples. The deformation $\bar{e}_t$ of the X direction, Z direction, and their total deformation are plotted in both work and joint spaces. They are defined as $M_{Cx}$, $M_{Cz}$, $M_{Ct}$, $M_{Jx}$, $M_{Jz}$, and $M_{Jt}$, respectively. Generally, the deformation is mainly caused by the moment relative to the base arising from the payload gravity. The deformation map in the workspace shows that the deformation mainly lies in the Z direction and grows as the boom lift extends farther in that direction. The deformation map in the joint space shows that the extension $d_2$ impacts the deformation more as the beam extension leads to a larger moment.

To verify the static deformation compensation, the BLMR is commanded to follow a velocity and acceleration constrained 1-meter elevation trajectory (dashed line in) with the initial condition given by $$p_{e0} = \left\{ 2209.5058 \quad 0 \quad 1300.4401 \quad 0 \quad \frac{\pi}{2} \quad 0 \right\}^{\top}. \quad (28)$$

The corresponding initial joint position $\tilde{h}_0$ is $$\vec{h}_0 = \left\{ 0 \quad 0 \quad 0 \quad 0 \quad 0 \quad -\frac{\pi}{2} \quad 0 \right\}^{\top}. \quad (29)$$

Figure 6A:
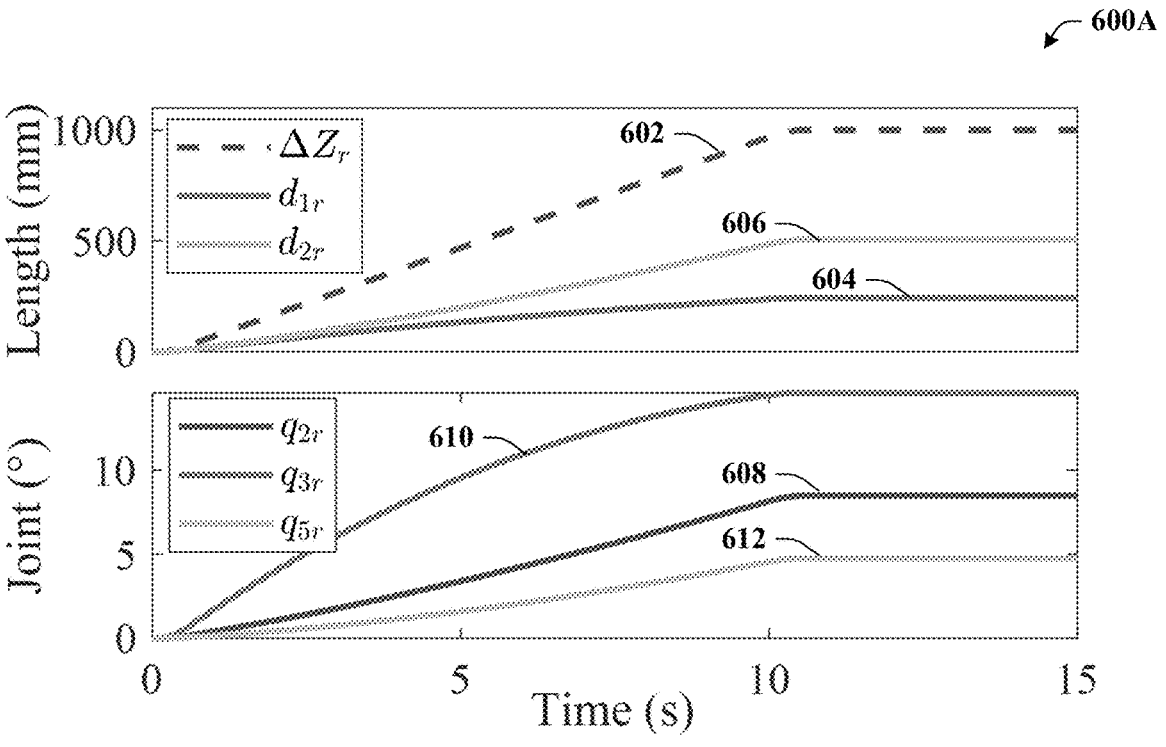
FIG. 6A depicts a plot diagram illustrating a reference trajectory of an end effector over time of a BLMR system and IK results in accordance with certain embodiments of this disclosure.

The corresponding EMC trajectory d and robot trajectory are calculated with (5) and are plotted in FIG. 6A.

With reference now to FIG. 6A, a plot diagram 600A is depicted illustrating a reference trajectory of an end effector over time of a BLMR system and IK results in accordance with certain embodiments of this disclosure.

Here, the change in z-axis rotation (e.g., plot 602) is shown. It is assumed that the $d_{1r}$ (e.g., plot 604) and $d_{2r}$ (e.g., plot 606) are the reference movement of 2 EMCs and $q_{2r}$, $q_{3r}$, and $q_{5r}$ (e.g., plots 608, 610, and 612, respectively) are the reference movement of the robot joints while the rest of joints $q_{1r}$, $q_{4r}$, and $g_{6r}$ remain zero. The end effector tracking error $e_x$ and $e_z$ in the X and Z directions with and without the static deformation compensation are captured with a laser tracker and illustrated in FIG. 6B.

Figure 6B:
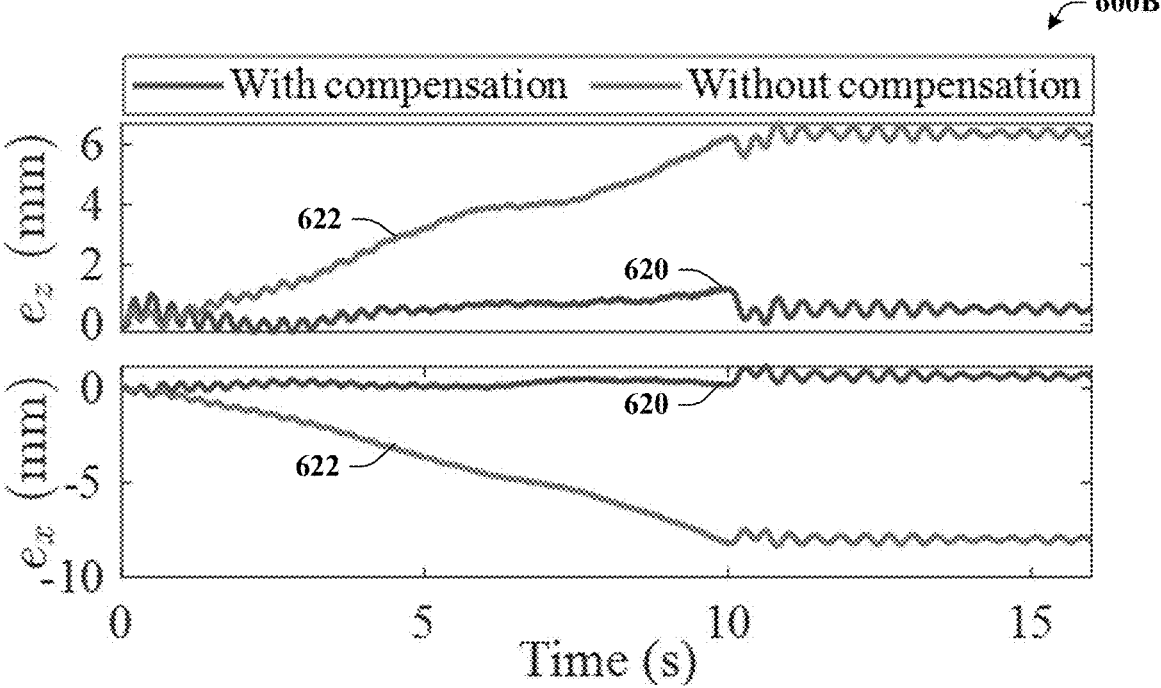
FIG. 6B depicts a plot diagram illustrating an open-loop BLMR end effector tracking error over time with and without static deformation compensation in accordance with certain embodiments of this disclosure.

Referring now to FIG. 6B, a plot diagram 600B is depicted illustrating an open-loop BLMR end effector tracking error over time with static deformation compensation (e.g., plot 620) and without (e.g., plot 622) static deformation compensation in accordance with certain embodiments of this disclosure.

The deviation of the uncompensated trajectory from the reference grows as the EMCs extend. The steady-state error (SSE) and root mean square error (RMSE) of the trajectory with and without compensation are shown in below. The motion accuracy is enhanced by the static deformation compensation while oscillation exists due to the flexibility of the BLMR. The current static deformation compensation scheme has limitations and may not entirely eliminate the SSE. The deformation at each point can be estimated using cubic interpolation with the static deformation map. The static deformation map can be constructed with the robot fixed on the BMLR tip while the different configurations of the industrial robot also affect the boom lift deformation.

TABLE III

STEADY-STATE ERROR AND ROOT MEAN
SQUARE ERROR OF TRAJECTORY WITH AND
WITHOUT STATIC DEFORMATION COMPENSATION

|  | SSE (mm) | RMSE (mm) |
|---|---|---|
| With Compensation | 0.8602 | 0.7197 |
| Without Compensation | 10.2252 | 6.0562 |

With regard to vibration compensation of the BLMR prototype 400, similar tracking experiments can be exploited to evaluate the feedforward trajectory generation method of TVIS techniques 302, and the proposed feedback control method JVCI techniques 320, as well as their combinations to alleviate the motion-induced vibration of the BLMR. TVIS requires the natural frequency and damping ratio of BLMR to be continuously updated. Natural frequency and damping ratio maps of the BLMR system can be captured with a laser tracker capturing the impact responses, similar to the deformation map sampling grid. For BLMR and general extendable beam systems, the first bending mode is dominant. The damping ratio can be calculated with the first few resonant peaks and troughs [28] under the first bending mode, given by $$\xi(d) = \frac{\ln\left(\frac{\sum Y_{2k-1}}{\sum Y_{2k}}\right)}{\sqrt{(\pi)^2 + \left(\ln\left(\frac{\sum Y_{2k-1}}{\sum Y_{2k}}\right)\right)^2}}, \quad (30)$$

where $Y_{2k-1}$ and $Y_{2k}$ can be the peak and trough in the oscillatory impact responses. It is observed that the damping ratio difference with different extensions is generally small. As the number of sets of peaks and troughs used to calculate the damping ratio increases, an average value converges to 0.0387, which can be applied across the extension space. With this damping ratio, the natural frequency map can be calculated from the resonances in the impact responses. Frequency maps in the workspace and joint space are defined with $F_C$ and $F_J$ respectively, as shown in FIG. 7A.

Figures 7A, 7B:
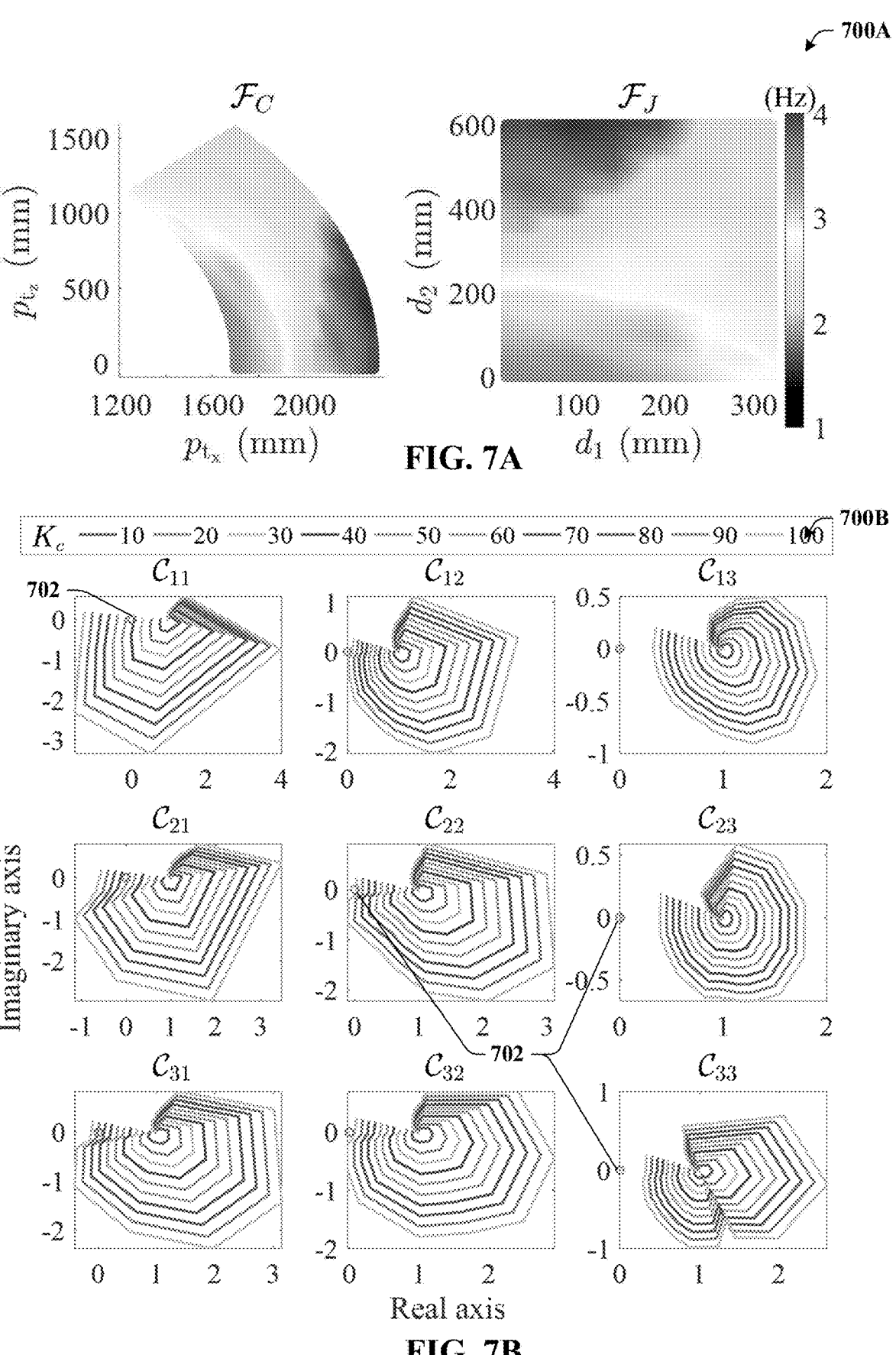
FIG. 7A illustrates a diagram showing an example natural frequency map of BLMR under different extension states in accordance with certain embodiments of this disclosure.
FIG. 7B illustrates a diagram showing an example of Nyquist diagrams $C_{mn}$ of the closed-loop system $G_c(s)$ with different extension lengths $d_{mn}$ in accordance with certain embodiments of this disclosure.

Turning now to FIG. 7A, illustrated is a diagram 700A showing an example natural frequency map of BLMR under different extension states in accordance with certain embodiments of this disclosure.

In contrast to the uniform damping ratio, the natural frequency map exhibits the variation, especially along $d_2$ direction. The natural frequency decreases as the BLMR reaches a farther or higher position. The parameters of TVIS can be estimated using cubic interpolation via the frequency map.

Moreover, the feedback control method JVCI techniques 320 can regulate the vibrations in the XZ plane, and thus three joints $q_2$, $q_3$, and $q_5$ can be exploited to compensate for the vibration of $p_r$. According to IMU acceleration and angular speed resolution, the covariance matrices of state function and measurement in the EKF can be set to diag{0.01, 0.01, 0.01, 0.001, 0.001, 0.001, 0.1, 0.1, 0.1} and diag{0.01, 0.01, 0.01}.

The Jacobian constraint $\delta p_r = J_r \delta q_r$ in (18) can be underdetermined, leaving room for optimization. The under-determined constraints can be exploited to reduce the optimization variables to only $\delta q_{r5}$ to convert the problem into an unconstrained optimization. Such potentially reduces the computational load and enables the real-time solution of the optimization problem (18). To account for their different nominal values, the coefficients $w_1$ and $w_2$ can be set to 1 and $5\times10^6$. The vibration $\delta p_t$ can be allocated to the industrial robot following (18).

Since the change of the extension lengths is sufficiently slow compared to the structural dynamics, the stability of the LPV system potentially can be guaranteed if the JVCI feedback control is stable at all extension lengths. The overall open-loop system $G_o(s; d)$ from the robotic joints $q_2$, $q_3$, and $q_s$ to the tip vibration can be identified at different extension states, and $d_1$ and $d_2$ can be sampled with 125 and 250 mm spacing, respectively. The $m^{th}$ $d_1$ sample and the $n^{th}$ $d_2$ sample can be defined as $d_{mn}$, formulating a sampling grid. The sinusoidal references with different frequencies and amplitudes can be commanded to $q_2$, $q_3$, and $q_5$ to measure the corresponding responses of $a(t)$ and $\omega(t)$.

This sequence also formulates a set of frequency response functions (FRFs) $G_o(j\omega_f; d_{mn})$, where $\omega_f$ can be the measured frequency. Each measured FRF can correspond to a point in the sampling grid of d. The associated FRF can build the overall open-loop LPV transfer function following (21). The stability of this LPV system can be verified with the closed-loop stability of the generalized Nyquist theorem. The Nyquist plot $C_{mn}$ of the closed-loop system with different gains under different extension states is shown in FIG. 7B.

With reference now to FIG. 7B, illustrated is a diagram 700B showing an example of Nyquist diagrams $C_{mn}$ of the closed-loop system $G_c(s)$ with different extension lengths $d_{mn}$ in accordance with certain embodiments of this disclosure. The sampling interval of gain $K_c$ can be set as 10 for better visualization. To ensure the stability of the system, dots 702 at respective origins should be outside the encirclements. According to this rule, the gain $K_c$ can be set to 40 in the experiment.

With settled parameters, the TVIS techniques 302, JVCI techniques 320, and their combination can be implemented on the BLMR. The tracking error $e_x$ and $e_z$ in the X and Z directions are presented in FIG. 8A.

Figures 8A, 8B:
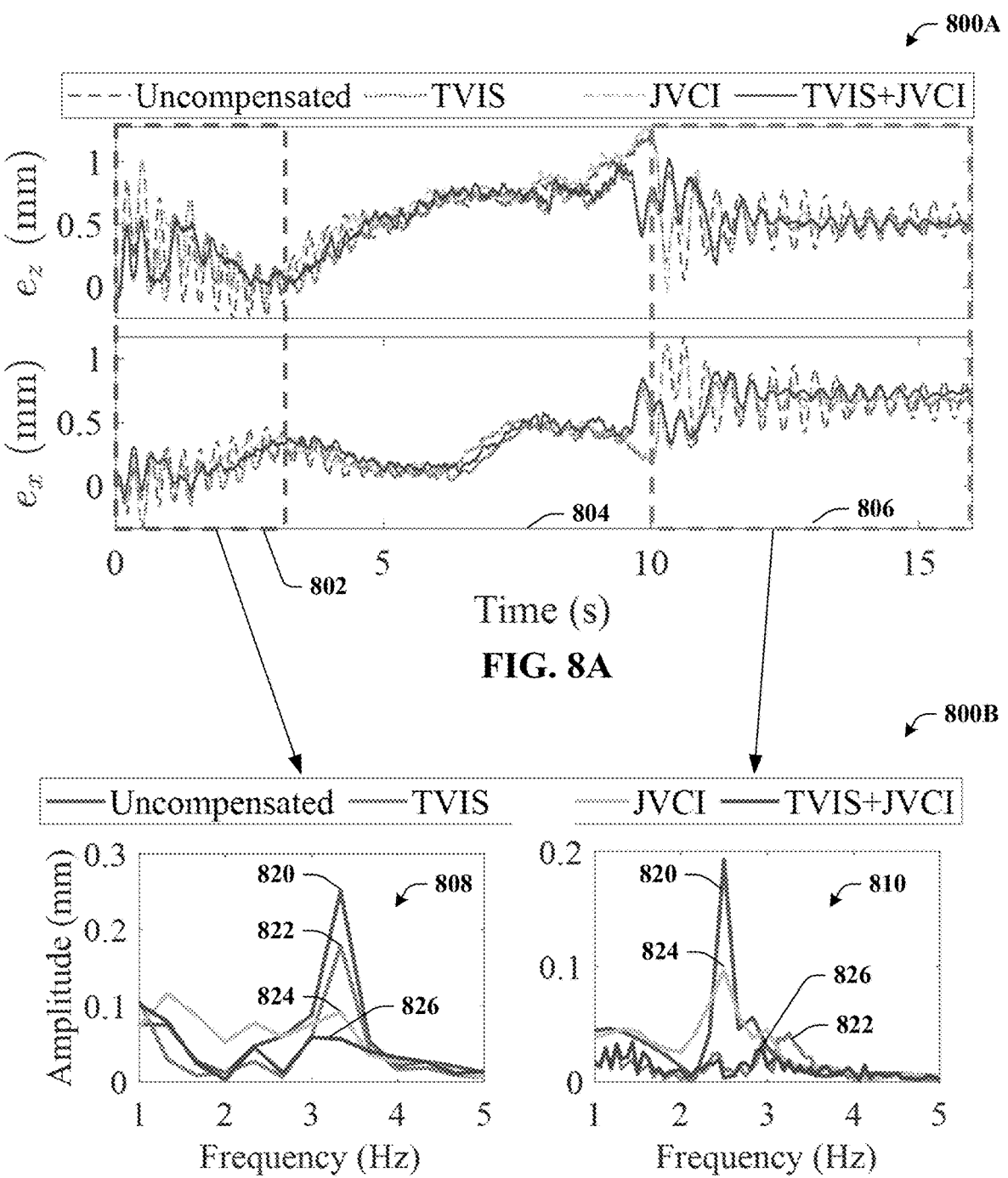
FIG. 8A illustrates a diagram showing various examples of end effector tracking errors over time of the BLMR without compensation, with TVIS techniques, with JVCI techniques, and combinations thereof in accordance with certain embodiments of this disclosure.
FIG. 8B illustrates a diagram showing an example spectrum of the tracking error over frequency of the BLMR with no compensation, with TVIS techniques, JVCI techniques, and combinations thereof in accordance with certain embodiments of this disclosure.

Turning now to FIG. 8A, illustrated is a diagram 800A showing an end effector tracking error over time of the BLMR without compensation, with TVIS techniques, JVCI techniques, and combinations thereof in accordance with certain embodiments of this disclosure. Plots are organized into three time windows comprising a first period 802 from zero to about three seconds, a second period from about three seconds to about 10 seconds and a third period 806 greater than about 10 seconds.

To evaluate the performance, in addition to the peak value of a fast Fourier transform (FFT) of the vibration signal at the beginning (e.g., first period 802) and the end (e.g., third period 806), shown in FIG. 8A, the convergence time of residual vibration is also considered, which can be defined as the time when the amplitude of the vibration is less than about 0.05 mm after the BMLR stops motion. The average vibration reduction percentage R can be defined as $$R = 1 - \frac{1}{2}\left(\frac{A_{c1}}{A_{u1}} + \frac{A_{c2}}{A_{u2}}\right),$$ (31)

where $A_{c1}$ and $A_{c2}$ can be the compensated peak values at the beginning and the end; $A_{u1}$ and $A_{u2}$ can be the uncompensated peak values at the beginning and the end, and the peak values are shown in FIG. 8B.

With reference now to FIG. 8B, illustrated is a diagram 800B showing an example spectrum of the tracking error over frequency of the BLMR with no compensation, with TVIS techniques, JVCI techniques, and combinations thereof in accordance with certain embodiments of this disclosure. A first plot 808 is given on the left portion of FIG. 8B representative of the first period 802 of FIG. 8A and a second plot 810 is provided at the right portion of FIG. 8B indicative of the third period 806 of FIG. 8A.

The detailed comparison is shown in. It is observed that all the vibration compensation methods reduced vibration to some extent over the uncompensated example 820. The performance of JVCI compensation 824 is enhanced compared with TVIS compensation 822 as the former considers the disturbances from robot movement in real-time. TVIS compensation 822 can highly depend on the accuracy of the natural frequency and damping ratio map, but constructing such maps with smaller grids can contribute to higher costs. TVIS compensation 822 is therefore typically useful to compensate for vibration induced during boom lift extension movement trajectories and is not effective in static scenes where there is no boom lift movement. The combination of JVCI and TVIS 826 further improves the tracking performance, indicating that the combination is a promising approach for vibration alleviation in boom lifts. This shows the potential to combine the JVCI techniques 320 with TVIS techniques 302 (e.g., as illustrated in FIG. 3) via rough (e.g., lower cost) natural frequency and damping ratio maps to achieve enhanced performance with less cost.

TABLE IV

TRACKING PERFORMANCE WITH NO COMPENSATION,
TVIS, JVCI, AND THEIR COMBINATION

| Methods | Peak value at beginning/end (mm) | Convergence time (s) | Average vibration reduction percentage |
|---|---|---|---|
| No compensation | 0.2515/0.1925 | >6 | / |
| TVIS | 0.1791/0.0416 | ≈4 | 53.59% |
| JVCI | 0.0916/0.0971 | ≈3.5 | 56.57% |
| Combination | 0.0584/0.0291 | ≈3 | 80.83% |

Figure 9:
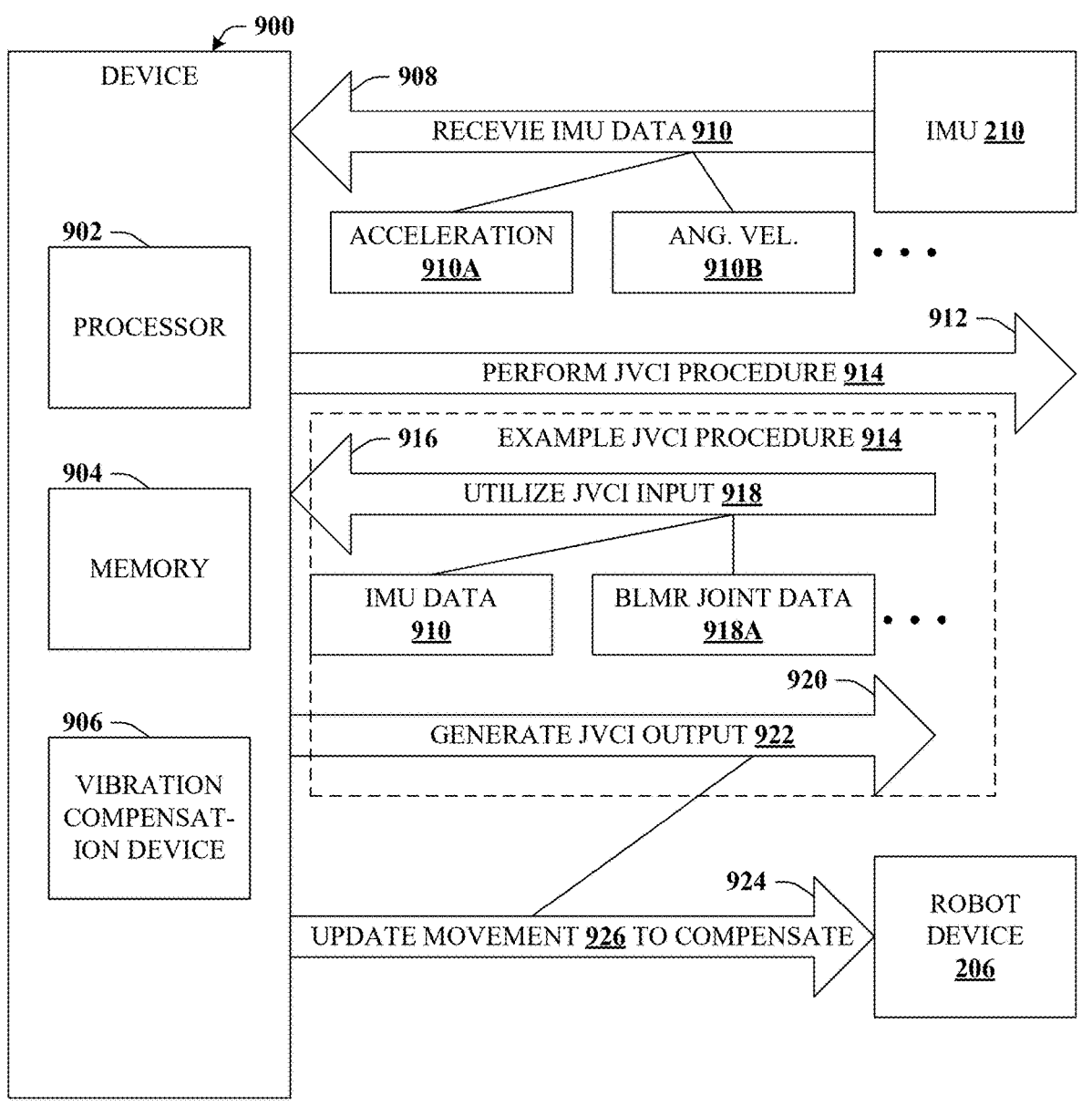
FIG. 9 depicts a schematic block diagram illustrating an example device that can utilize JVCI techniques, potentially in combination with other techniques, to compensate for vibrations exhibited in a BLMR system in accordance with certain embodiments of this disclosure.

Referring now to FIG. 9, a schematic block diagram is depicted illustrating an example device 900 that can utilize JVCI techniques 320, potentially in combination with other techniques (e.g., TVIS techniques 302, SDC techniques 306, . . . ) to compensate for vibrations exhibited in a BLMR system 200, 400 in accordance with certain embodiments of this disclosure. Device 900 can comprise all or a portion of elements detailed in connection with BLMR systems 200, 400. For example, in some embodiments, device 900 can be in communication (e.g., wired or wireless) with one or more elements of BLMR system 200, 400. In some embodiments, BLMR system 200, 400 can comprise device 900. Device 900 can comprise a processor 902 that can be specifically configured for use in connection with BLMR system 200, 400 and/or for vibration compensation. Device 900 can also comprise memory 904 that stores executable instructions that, when executed by processor 902, can facilitate the performance of operations.

Processor 902 can be a hardware processor having structural elements known to exist in connection with processing units or circuits, with various operations of processor 902 being represented by functional elements shown in the drawings herein that can require special-purpose instructions, for example, stored in memory 904 and/or vibration compensation device 906. Along with these special-purpose instructions, processor 902 and/or vibration compensation device 906 can be a special-purpose device. Further examples of the memory 904 and processor 902 can be found with reference to FIG. 13. It is to be appreciated that device 900 or computer 1302 can represent a server device or a client device and can be used in connection with implementing one or more of the systems, devices, or components shown and described in connection with FIG. 9 and other figures disclosed herein.

At reference numeral 908, device 900 can receive IMU data 910. IMU data can be received from any suitable IMU such as IMU 210 of BLMR system 200. Hence, the IMU can be situated proximal to a tip (e.g., tip 204) of a boom lift (e.g., boom lift 202) beam that supports a robot device (e.g., robot 206) comprising an end effector (e.g., end effector 208). As detailed, an IMU can be any suitable electronic device that measures or reports a body's specific force, angular rate, and sometimes the orientation of the body, using a combination of accelerometers, gyroscopes, magnetometers, or the like. IMUs can be composed of any such sensors, which can work together to provide a body's motion data (e.g., IMU data 910), typically in a time-series format. For instance, IMU data can include, e.g., acceleration data 910A (e.g., linear, angular, . . . ), angular velocity data 910B (e.g., rotation rates), or other suitable data such as, e.g., orientation data (e.g., pitch, roll, yaw, . . . ).

At reference numeral 912, device 900 can perform a JVCI procedure 914 (e.g., JVCI technique 320). JVCI procedure 914 can be configured to compensate for a vibration exhibited at the end effector (e.g., end effector 208) of the robot device. In that regard, as indicated at reference numeral 916, JVCI procedure 914 can include receiving and/or utilizing JVCI input 918. JVCI input 918 can include IMU data 910 (e.g., acceleration 910A, angular velocity 910B, . . . ) that indicates real time feedback relating to vibrations of the BLMR system.

In some embodiments, JVCI input data 918 can further include BLMR joint data 918A. BLMR joint data 918A can be indicative of an optimal dynamic allocation with stability proof of the BLMR system that is based on a linear parameter varying system (e.g., G(s; d)). As previously detailed, the linear parameter varying system can be a function of a Laplace variable suitable for a Laplace transformation and a distance variable indicative of an extension state of the boom lift beam in at least one dimension (e.g., X, Y, Z, . . . ).

In response to JVCI input 918, as indicated at reference numeral 920, device 900 can generate JVCI output 922. JVCI output 922 can be indicative of motion due to the vibration exhibited by the BLMR system. At reference numeral 924, based on the JVCI output 922, device 900 can update the movement of the robot device 206 to compensate for the motion due to the vibration exhibited at the end effector. Accordingly, the end effector of the robot device 206 can maintain improved precision for the task at hand despite being subject to vibrations that would otherwise negatively impact the precision and/or positioning of the end effector.

Turning now to FIG. 10, a schematic block diagram 1000 illustrating additional aspects or elements of the example device 900 that can utilize JVCI techniques to compensate for vibrations exhibited in a BLMR system in accordance with certain embodiments of this disclosure At reference numeral 1002, device 900 can use an extended Kalman filter (EKF) 1004. For example, as part of JVCI procedure 914, device 900 can determine or reconstruct the vibration based on the IMU data 910 via the EKF 1004. EKF 1004 can include all or a portion of EKF techniques 312 detailed in connection with FIG. 3. As introduced above, EKF 1004 can represent a mathematical algorithm used for estimating the state of a nonlinear dynamic system from noisy measurements. EKF 1004 can represent an extension of the traditional Kalman filter, which can only handle linear systems, whereas EKF 1004 can handle nonlinear systems. EKF 1004 can approximate the nonlinear system using a first-order Taylor series expansion, allowing it to handle non-linear systems. In that regard, EKF 1004 can employ a state transition model indicative of a mathematical representation of the system's dynamics, describing how the state evolves over time; a measurement model indicative of a mathematical representation of how the system's state is observed through measurements; and incorporate linearization in order to approximate the non-linear system by linearizing the state transition and measurement models around the current estimate of the state.

At reference numeral 1006, also potentially part of JVCI procedure 914, device 900 can associate a frame of the robot device 206 (e.g., frame 212T, 212E, . . . ) with a ground frame (e.g., frame 212G) of the BLMR system based on a three-dimensional Euler angle rotation.

At reference numeral 1008, device 900 can further perform a static deformation compensation (SDC) procedure 1010. SDC procedure 1010 can be configured to compensate for static deformation associated with the BLMR system. In some embodiments, as indicated at reference numeral 1012, SDC procedure 1010 can comprise determining a deformation map (e.g., see FIG. 5) based on measurements of a laser tracker device (e.g., laser tracker device 220).

At reference numeral 1014, device 900 can perform TVIS procedure 1016. TVIS procedure 1016 can be configured to compensate for boom lift vibrations based on a natural frequency of the BLMR system and a damping ratio of the BLMR system, which can include all or a portion of TVIS techniques 302 detailed in connection with FIG. 3 or otherwise herein. For example, as indicated reference numeral 1018, device 900 can determine or receive a natural frequency and a dampening ratio of the BLMR system. At reference numeral 1020, device 900 can compensate for boom lift vibrations (e.g., in a feedforward fashion) based on the natural frequency and dampening ratio.

As indicated previously, in some embodiments, JVCI output 922 alone can be utilized to compensate for vibrations, for example in certain deployments of BLMR system. In other embodiments, JVCI output 922 can be combined with other techniques to further improve vibration compensation. For example, at reference numeral 1022, device 900 can combine JVCI output 922 (e.g., real time feedback) with certain feedforward techniques such as output from SDC procedure 1010 and/or TVIS procedure 1016.

EXAMPLE METHODS

FIGS. 11 and 12 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 11, exemplary method 1100 is depicted. Method 1100 can utilize JVCI techniques, potentially in combination with other techniques, to compensate for vibrations exhibited in a BLMR system in accordance with certain embodiments of this disclosure. While method 1100 describes a complete method, in some embodiments, method 1100 can include one or more elements of method 1200, as illustrated by inserting A.

At reference numeral 1102, a device comprising at least one processor can receive inertial measurement unit (IMU) data from an IMU device of a boom-lift-mounted robot (BLMR) system. The IMU device can be situated proximal to the tip of a boom lift beam that supports a robot device comprising an end effector.

At reference numeral 1104, the device can perform a Jacobian-based vibration compensation via IMU (JVCI) process configured to compensate for a vibration exhibited at the end effector of the robot device. The JVCI procedure can receive JVCI input comprising BLMR joint data and the IMU data. In response, the device can generate JVCI output indicative of motion due to the vibration.

At reference numeral 1106, based on the JVCI output, the device can update the position of the end effector to compensate for the vibration. Method 1100 can terminate or continue to insert A, which is further detailed in connection with FIG. 12.

Turning now to FIG. 12, exemplary method 1200 is depicted. Method 1200 can provide additional aspects or elements relating to utilizing JVCI techniques to compensate for vibrations exhibited in a BLMR system in accordance with certain embodiments of this disclosure.

At reference numeral 1202, the device introduced at reference numeral 1102 comprising at least one processor that can reconstruct the vibration based on the IMU data and an extended Kalman filter (EKF).

At reference numeral 1204, the device can relate a frame of the robot device to a ground frame of the BLMR system by a three-dimensional Euler angle rotation.

At reference numeral 1206, the device can perform a static deformation compensation (SDC) process configured to compensate for static deformation associated with the BLMR system. In some embodiments, the SDC process can generate an output that can be combined with the JVCI output, and the combined output can be utilized to compensate for vibration.

Example Operating Environments

Figure 13:
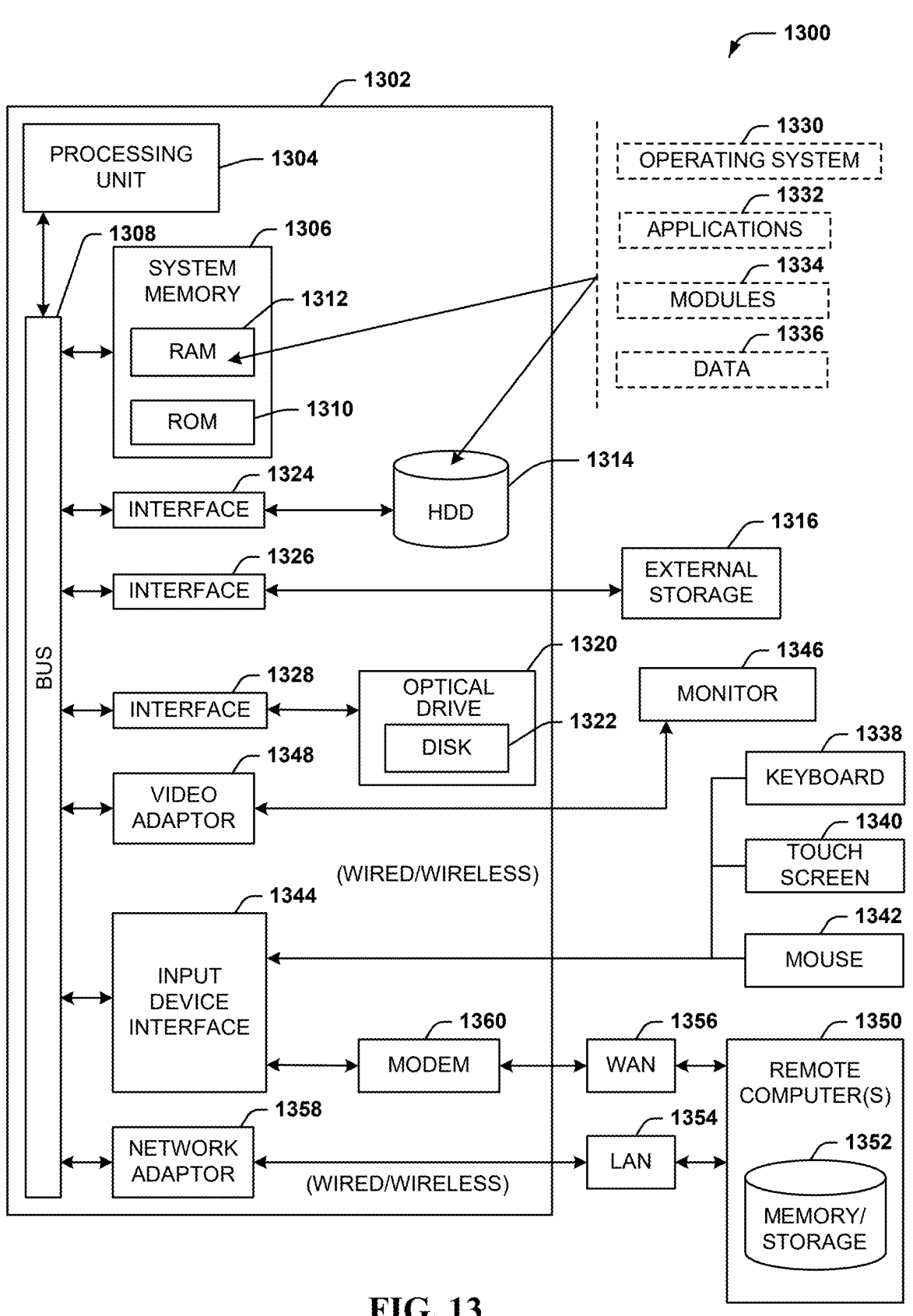
FIG. 13 illustrates an example block diagram of a computer operable to execute certain embodiments of this disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the method, described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries, and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external, and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, the use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
at least one processor; and
at least one memory that stores executable instructions that, when executed by the at least one processor, facilitate the performance of operations, comprising:
receiving inertial measurement unit (IMU) data from an IMU device of a boom-lift-mounted robot (BLMR) system, wherein the IMU device is situated proximal to a tip of a boom lift beam that supports a robot device comprising an end effector;
performing a Jacobian-based vibration compensation via IMU (JVCI) procedure configured to compensate for a vibration exhibited at the end effector of the robot device, wherein the JVCI procedure receives JVCI input comprising the IMU data and generates JVCI output indicative of motion due to the vibration; and
based on the JVCI output, updating a movement of the robot device to compensate for the motion due to the vibration exhibited at the end effector.

2. The device of claim 1, wherein the IMU data comprises an acceleration measurement of the vibration and an angular velocity measurement of the vibration.

3. The device of claim 1, wherein the JVCI input further comprises BLMR joint data indicative of an optimal dynamic allocation with a stability of proof of the BLMR system that is based on a linear parameter varying system.

4. The device of claim 3, wherein the linear parameter varying system is a function of a Laplace variable suitable for a Laplace transform and a distance variable indicative of an extension state of the boom lift beam in at least one dimension.

5. The device of claim 1, wherein the JVCI procedure further comprises reconstructing the vibration based on the IMU data and an extended Kalman filter.

6. The device of claim 1, wherein the JVCI procedure further comprises associating a frame of the robot device with a ground frame of the BLMR system based on a three-dimensional Euler angle rotation.

7. The device of claim 1, wherein the operations further comprise performing a static deformation compensation (SDC) procedure configured to compensate for static deformation associated with the BLMR system.

8. The device of claim 7, wherein the SDC procedure comprises determining a deformation map based on measurements of a laser tracker device.

9. The device of claim 1, wherein the operations further comprise performing a time varying input shaper (TVIS) procedure configured to compensate for boom lift vibrations based on a natural frequency of the BLMR system and a damping ratio of the BLMR system.

10. The device of claim 9, wherein the TVIS procedure comprises determining the natural frequency and the damping ratio.

11. The device of claim 9, wherein the operations further comprise combining an output of the TVIS procedure with the JVCI output to determine a combined vibration-compensation output, and using the combined vibration-compensation output to update a joint movement of the BLMR system.

12. A method, comprising:
receiving, by a device comprising at least one processor, inertial measurement unit (IMU) data from an IMU device of a boom-lift-mounted robot (BLMR) system, wherein the IMU device is situated proximal to a tip of a boom lift beam that supports a robot device comprising an end effector;
performing, by the device, a Jacobian-based vibration compensation via IMU (JVCI) process configured to compensate for a vibration exhibited at the end effector of the robot device, wherein the JVCI process receives JVCI input comprising BLMR joint data and the IMU data, and generates JVCI output indicative of motion due to the vibration; and based on the JVCI output, updating, by the device, a position of the end effector to compensate for the vibration.

13. The method of claim 12, wherein the JVCI process further comprises reconstructing, by the device, the vibration based on the IMU data and an extended Kalman filter.

14. The method of claim 12, wherein the JVCI process further comprises relating, by the device, a frame of the robot device to a ground frame of the BLMR system by a three-dimensional Euler angle rotation.

15. The method of claim 12, further comprising performing, by the device, a static deformation compensation (SDC) process configured to compensate for static deformation associated with the BLMR system.

16. A non-transitory computer-readable medium comprising instructions that, in response to execution, cause a system comprising a processor to perform operations, comprising:

receiving inertial measurement unit (IMU) data from an IMU device of a boom-lift-mounted robot (BLMR) system, wherein the IMU device is situated proximal to a tip of a boom lift beam structure that supports a robot device comprising an end effector;

performing a Jacobian-based vibration compensation via IMU (JVCI) configured to compensate for a vibration exhibited at the tip of the boom lift beam structure, wherein the JVCI input comprises the IMU data, and generates JVCI output indicative of motion due to the vibration; and based on the JVCI output, updating a position of the end effector to compensate for the vibration.

17. The non-transitory computer-readable medium of claim 16, wherein the JVCI input further comprises BLMR joint data indicative of an optimal dynamic allocation with a stability of proof of the BLMR system that is based on a linear parameter varying system comprising a Laplace variable suitable for a Laplace transform and a distance variable indicative of an extension state of the boom lift beam structure in at least one dimension.

18. The non-transitory computer-readable medium of claim 16, wherein the JVCI further comprises reconstructing the vibration based on the IMU data and an extended Kalman filter.

19. The non-transitory computer-readable medium of claim 16, wherein the operations further comprise performing a static deformation compensation (SDC) configured to compensate for static deformation associated with the BLMR system.

20. The non-transitory computer-readable medium of claim 19, wherein the operations further comprise combining an output of the SDC with the JVCI output to determine a combined vibration-compensation output, and using the combined vibration-compensation output to update a joint movement of the BLMR system.

* * * * *